United States Patent
Ko et al.

(10) Patent No.: US 12,513,760 B2
(45) Date of Patent: Dec. 30, 2025

(54) WIRELESS COMMUNICATION METHOD USING MULTI-LINK AND WIRELESS COMMUNICATION TERMINAL USING SAME

(71) Applicant: WILUS INSTITUTE OF STANDARDS AND TECHNOLOGY INC., Gyeonggi-do (KR)

(72) Inventors: Geonjung Ko, Gyeonggi-do (KR); Juhyung Son, Gyeonggi-do (KR); Sanghyun Kim, Seoul (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 359 days.

(21) Appl. No.: 17/801,242

(22) PCT Filed: Feb. 25, 2021

(86) PCT No.: PCT/KR2021/002419
§ 371 (c)(1),
(2) Date: Aug. 20, 2022

(87) PCT Pub. No.: WO2021/172919
PCT Pub. Date: Sep. 2, 2021

(65) Prior Publication Data
US 2023/0076285 A1    Mar. 9, 2023

(30) Foreign Application Priority Data

Feb. 25, 2020  (KR) .................. 10-2020-0022885
Apr. 2, 2020   (KR) .................. 10-2020-0040524

(51) Int. Cl.
H04W 76/15    (2018.01)

(52) U.S. Cl.
CPC .................................. *H04W 76/15* (2018.02)

(58) Field of Classification Search
CPC ....... H04W 76/15; H04W 84/12; Y02D 30/70
See application file for complete search history.

(56) References Cited

U.S. PATENT DOCUMENTS

2019/0150214 A1   5/2019  Zhou et al.
2019/0335454 A1   10/2019 Huang et al.
(Continued)

FOREIGN PATENT DOCUMENTS

KR    10-2018-0006841    1/2018

OTHER PUBLICATIONS

International Search Report for PCT/KR2021/002419 mailed on Jun. 18, 2021 and its English translation from WIPO (now published as WO 2021/172919).
(Continued)

*Primary Examiner* — Mansour Oveissi
(74) *Attorney, Agent, or Firm* — WOMBLE BOND DICKINSON (US) LLP

(57) ABSTRACT

Disclosed is a station which communicates with an access point (AP) multi-link device using a plurality of links. The AP multi-link device comprises: a transceiver, and a processor. The processor receives, by using the transceiver, a management frame from the AP multi-link device, and obtains, from the management frame, a multi-link setup element including information required for setting the plurality of links. The multi-link setup element includes a common part including information corresponding to all links signaled by the multi-link setup element, and link-specific parts independently including information corresponding to each of the plurality of links signaled by the multi-link setup element.

15 Claims, 15 Drawing Sheets

(56) References Cited

U.S. PATENT DOCUMENTS

| | | |
|---|---|---|
| 2021/0014776 A1 | 1/2021 | Patil et al. |
| 2021/0144787 A1* | 5/2021 | Kwon .................... H04W 72/23 |
| 2022/0225236 A1* | 7/2022 | Bang ..................... H04W 52/02 |
| 2022/0377839 A1* | 11/2022 | Jang ...................... H04W 76/11 |

OTHER PUBLICATIONS

Written Opinion of the International Searching Authority for PCT/KR2021/002419 mailed on Jun. 18, 2021 and its English translation by Google Translate (now published as WO 2021/172919).
Insun Jang et al.: "Indication of Multi-link Information", IEEE 802.11-20/0028r0, Jan. 13, 2020, slides 1-13.
Alexaner Min et al.: "Multi-link power save operation", IEEE 802.11-19/1544r2, Jan. 13, 2020, slides 1-16.
Xiaofei Wang et al.: "Discussion on Multi-link Operations", IEEE 802.11-19/1213r0, Jul. 15, 2019, slides 1-10.
Office Action dated Jun. 24, 2022 for Korean Patent Application No. 10-2021-7036378 and its English translation provided by Applicant's foreign counsel.
Cheng Chen et al.: "Multi-link Policy Framework", IEEE 802.11-19/1932r0, Nov. 11, 2019, slides 1-11.
Duncan Ho et al.: "MLA MAC Addresses Considerations", IEEE 802.11-19/1899r1, Nov. 2019, slides 1-11.
Office Action dated Oct. 13, 2022 for Korean Patent Application No. 10-2021-7036378 and its English translation provided by Applicant's foreign counsel.
International Preliminary Report on Patentability (Chapter I) for PCT/KR2021/002419 issued on Aug. 30, 2022 and its English translation from WIPO (now published as WO2021/172919).

* cited by examiner (a) Example 1          (b) Example 2

WIRELESS COMMUNICATION METHOD USING MULTI-LINK AND WIRELESS COMMUNICATION TERMINAL USING SAME

CROSS-REFERENCE TO RELATED APPLICATIONS

This application is the U.S. National Stage of International Patent Application No. PCT/KR2021/002419 filed on Feb. 25, 2021, which claims the priority to Korean Patent Application No. 10-2020-0022885 filed in the Korean Intellectual Office on Feb. 25, 2020, and Korean Patent Application No. 10-2020-0040524 filed in the Korean Intellectual Office on Apr. 2, 2020, the entire contents of which are incorporated herein by reference.

TECHNICAL FIELD

The disclosure relates to a wireless communication method using a multi-link and a wireless communication terminal using the same.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

As a wireless LAN standard after 802.11ac and 802.11ad, the IEEE 802.11ax (high efficiency WLAN, HEW) standard for providing a high-efficiency and high-performance wireless LAN communication technology in a high-density environment, in which APs and terminals are concentrated, is in the development completion stage. In an 802.11ax-based wireless LAN environment, communication with high frequency efficiency should be provided indoors/outdoors in the presence of high-density stations and access points (APs), and various technologies have been developed to implement the same.

In order to support new multimedia applications, such as high-definition video and real-time games, the development of a new wireless LAN standard has begun to increase a maximum transmission rate. In IEEE 802.11be (extremely high throughput, EHT), which is a 7th generation wireless LAN standard, development of standards is underway aiming at supporting a transmission rate of up to 30 Gbps via a wider bandwidth, an increased spatial stream, multi-AP cooperation, and the like in a 2.4/5/6 GHz band.

DETAILED DESCRIPTION OF THE INVENTION

Technical Problem

An embodiment of the disclosure is to provide a wireless communication method using a multi-link and a wireless communication terminal using the same.

Technical Solution

According to an embodiment of the disclosure, a station communicating with an access point (AP) multi-link device using a plurality of links may include a transceiver and a processor. The processor may be configured to receive a management frame from the AP multi-link device by using the transceiver, and obtain a multi-link setup element including information required for setting the plurality of links from the management frame. The multi-link setup element may include a common part including information corresponding to all links signaled by the multi-link setup element and a link-specific part independently including information corresponding to each of a plurality of links signaled by the multi-link setup element.

The link-specific part may include a BSS color field indicating a BSS color for each link.

The plurality of links may be assigned different BSS colors.

An identifier of another station affiliated with a non-AP multi-link device to which the station is affiliated may be the same as the identifier of the station.

The identifier may be an associated ID (AID).

The channel setting of one link among the plurality of links may be the same as the channel setting of a single link set by the AP multi-link device.

The processor may be configured to inherit information signaled with a parameter related to the operation of the single link to apply the same to some of parameters related to an operation of the multi-link.

The activation time period of each of the plurality of links may be designated.

According to an embodiment of the disclosure, an access point (AP) multi-link device using a plurality of links may include a transceiver, and a processor. The processor may be configured to generate a multi-link setup element including information required for setting the plurality of links, and insert the multi-link setup element into a management frame. The multi-link setup element may include a common part including information corresponding to all links signaled by the multi-link setup element and a link-specific part independently including information corresponding to each of a plurality of links signaled by the multi-link setup element.

The link-specific part may include a BSS color field indicating a BSS color for each link.

The plurality of links may be assigned different BSS colors.

The AP multi-link device may assign a single value with an identifier of a station to a plurality of stations affiliated with one non-AP multi-link device.

The identifier may be an associated ID (AID).

The channel setting of one link among the plurality of links may be the same as the channel setting of a single link set by the AP multi-link device.

The information signaled with a parameter related to an operation of the single link may be inherited and applied to some of the parameters related to an operation of the multi-link.

The activation time period of each of the plurality of links may be designated.

According to an embodiment of the disclosure, an operation method of a station communicating with an access point (AP) multi-link device using a plurality of links may include receiving a management frame from the AP multi-link device, and obtaining a multi-link setup element including information required for setting the plurality of links from the management frame. The multi-link setup element may include a common part including information corresponding to all links signaled by the multi-link setup element and a link-specific part independently including information corresponding to each of a plurality of links signaled by the multi-link setup element.

The link-specific part may include a BSS color field indicating a BSS color for each link.

The plurality of links may be assigned different BSS colors.

An identifier of another station affiliated with a non-AP multi-link device to which the station is affiliated may be the same as the identifier of the station.

Advantageous Effects

An embodiment of the disclosure efficiently provides a wireless communication method using a multi-link and a wireless communication terminal using the same.

MODE FOR CARRYING OUT THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

Hereinafter, in the present invention, a field and a subfield may be interchangeably used.

Figure 1:
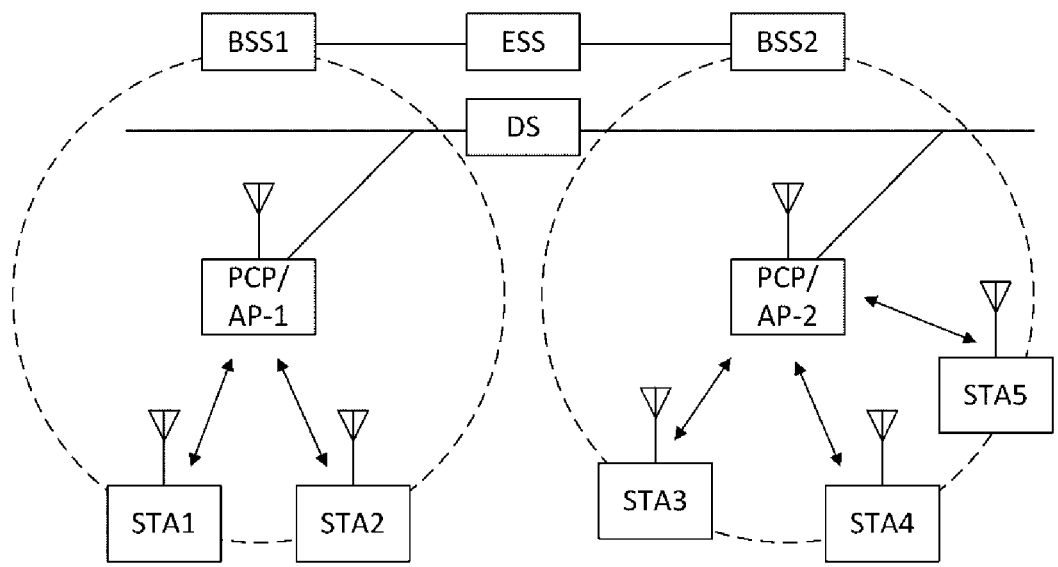
FIG. 1 illustrates a wireless LAN system according to an embodiment of the present invention.

FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points AP-1 and AP-2 which are stations providing a distribution service, and a distribution system (DS) connecting the multiple access points AP-1 and AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms.

A station for wireless communication includes a processor and a communication unit and according to the embodiment, may further include a user interface unit and a display unit. The processor may generate a frame to be transmitted through a wireless network or process a frame received through the wireless network and besides, perform various processing for controlling the station. In addition, the communication unit is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
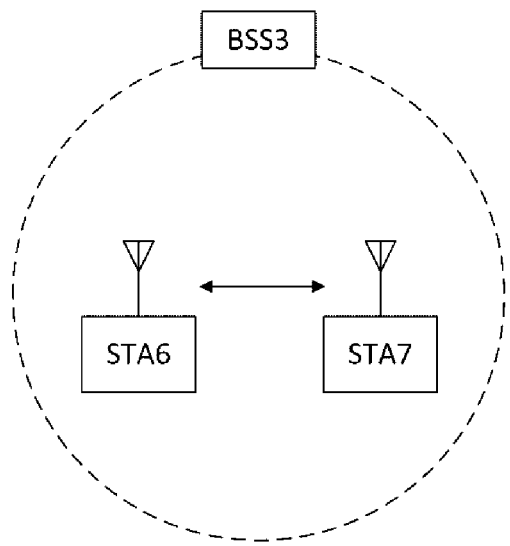
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
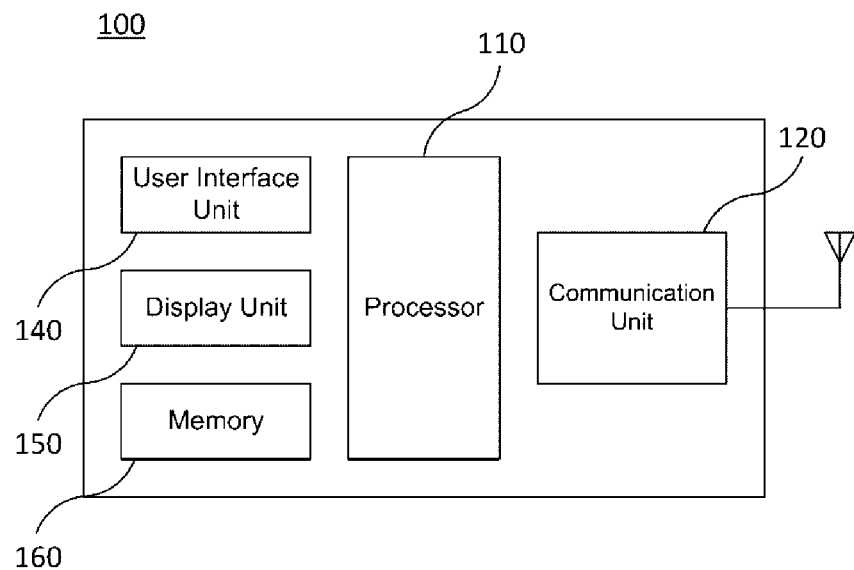
FIG. 3 illustrates a configuration of a station according to an embodiment of the present invention.

FIG. 3 is a block diagram illustrating a configuration of a station 100 according to an embodiment of the present invention. As illustrated in FIG. 3, the station 100 according to the embodiment of the present invention may include a processor 110, a communication unit 120, a user interface unit 140, a display unit 150, and a memory 160.

First, the communication unit 120 transmits and receives a wireless signal such as a wireless LAN packet, or the like and may be embedded in the station 100 or provided as an exterior. According to the embodiment, the communication unit 120 may include at least one communication module using different frequency 5 bands. For example, the communication unit 120 may include communication modules having different frequency bands such as 2.4 GHz, 5 GHz, 6 GHz and 60 GHz. According to an embodiment, the station 100 may include a communication module using a frequency band of 7.125 GHz or more and a communication module using a frequency band of 7.125 GHz or less. The respective communication modules may perform wireless communication with the AP or an external station according to a wireless LAN standard of a frequency band supported by the corresponding communication module. The communication unit 120 may operate only one communication module at a time or simultaneously operate multiple communication modules together according to the performance and requirements of the station 100. When the station 100 includes a plurality of communication modules, each communication module may be implemented by independent elements or a plurality of modules may be integrated into one chip. In an embodiment of the present invention, the communication unit 120 may represent a radio frequency (RF) communication module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the communication unit 120, and the like. That is, the processor 110 may be a modem or a modulator/demodulator for modulating and demodulating wireless signals transmitted to and received from the communication unit 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the communication unit 120 may be implemented while being integrated into a single chip or implemented as a separate chip. Further, in the embodiment of the present invention, some components of the 5 station 100, for example, the user interface unit 140 and the display unit 150 may be optionally provided in the station 100.

Figure 4:
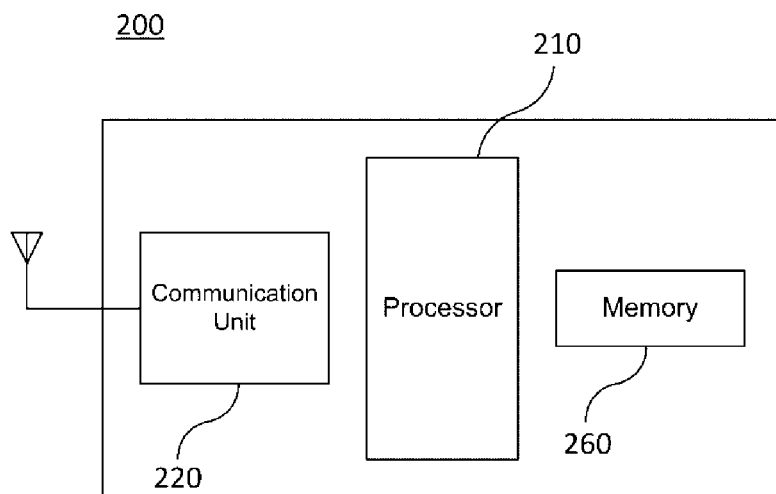
FIG. 4 illustrates a configuration of an access point according to an embodiment of the present invention.

FIG. 4 is a block diagram illustrating a configuration of an AP 200 according to an embodiment of the present invention. As illustrated in FIG. 4, the AP 200 according to the embodiment of the present invention may include a processor 210, a communication unit 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the communication unit 220 for operating the BSS in at least one frequency band. As described in the embodiment of FIG. 3, the communication unit 220 of the AP 200 may also include a plurality of communication modules using different frequency bands. That is, the AP 200 according to the embodiment of the present invention may include two or more communication modules among different frequency bands, for example, 2.4 GHz, 5 GHz, 6 GHz and 60 GHz together. Preferably, the AP 200 may include a communication module using a frequency band of 7.125 GHz or more and a communication module using a frequency band of 7.125 GHz or less. The respective communication modules may perform wireless communication with the station according to a wireless LAN standard of a frequency band supported by the corresponding communication module. The communication unit 220 may operate only one communication module at a time or simultaneously operate multiple communication modules together according to the performance and requirements of the AP 200. In an embodiment of the present invention, the communication unit 220 may represent a radio frequency (RF) communication module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the communication unit 220. The processor 210 controls various operations such as wireless signal transmission/reception of the AP 200 according to the embodiment of the present invention. A detailed embodiment thereof will be described below.

Figure 5:
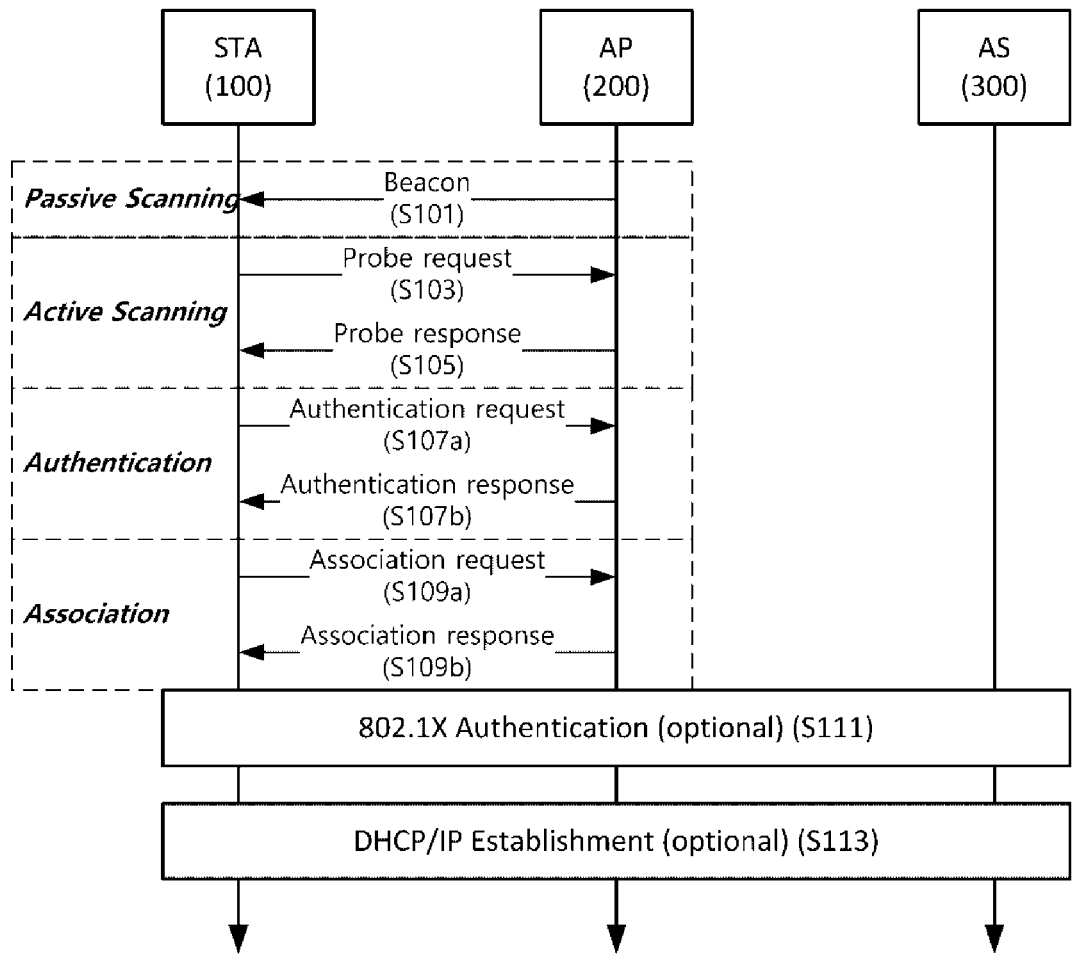
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
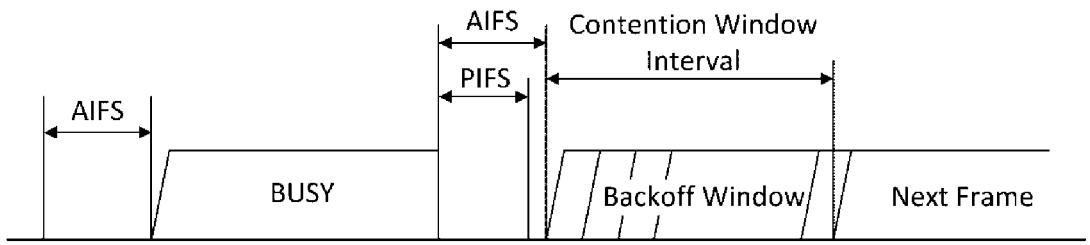
FIG. 6 illustrates a carrier sense multiple access (CSMA)/collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an inter frame space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number determined by the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

<Examples of Various PPDU Formats>

Figure 7:
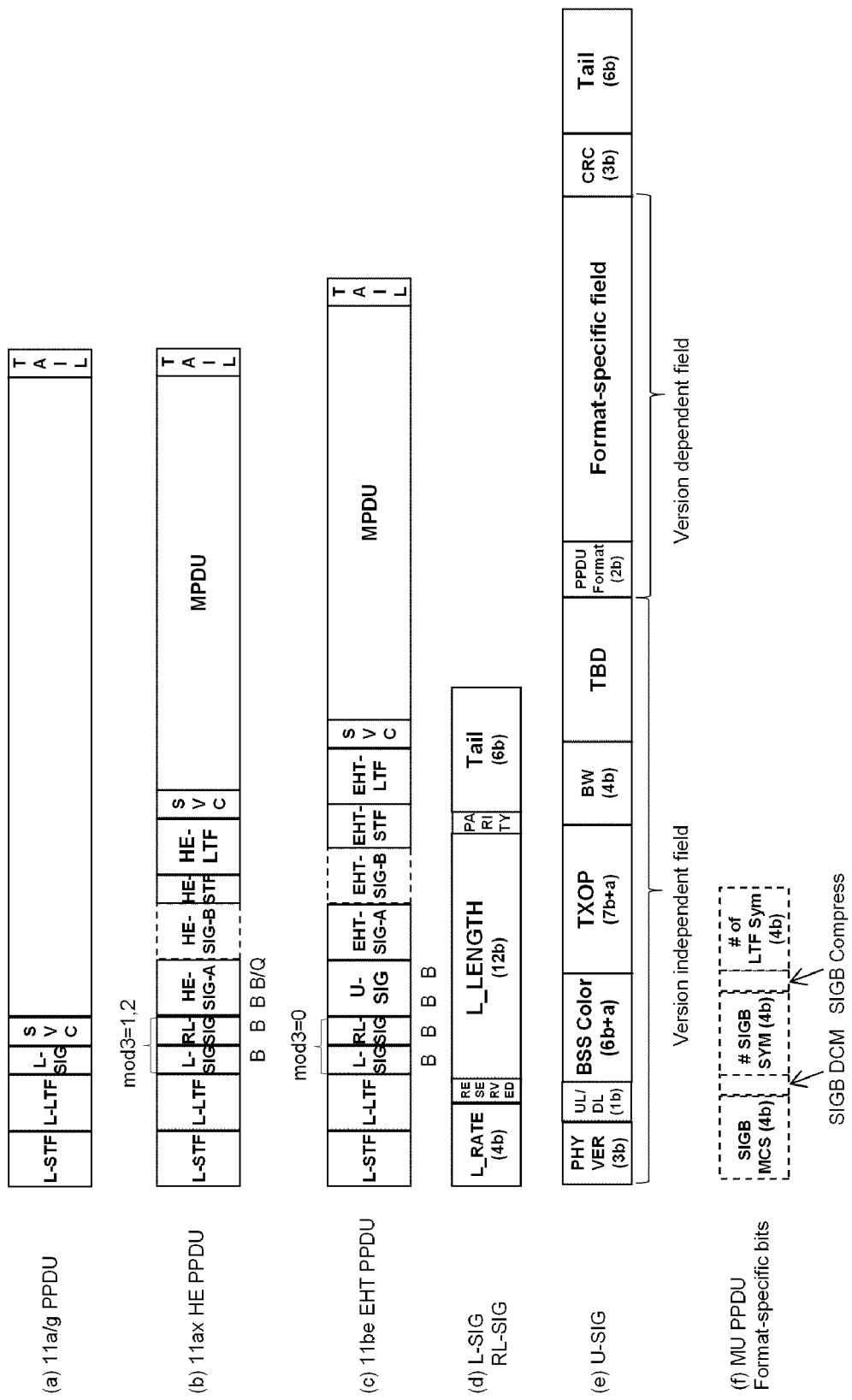
FIG. 7 illustrates an example of a format of a PLCP Protocol data unit (PPDU) for each of various standard generations.

FIG. 7 illustrates an example of a format of a PLCP Protocol data unit (PPDU) for each of various standard generations. More specifically, FIG. 7(a) illustrates an embodiment of a legacy PPDU format based on 802.11a/g, FIG. 7(b) illustrates an embodiment of an HE PPDU format based on 802.11ax, and FIG. 7(c) illustrates an embodiment of a non-legacy PPDU (i.e., EHT PPDU) format based on 802.11be. FIG. 7(d) illustrates detailed field configurations of RL-SIG and L-SIG commonly used in the PPDU formats.

Referring to FIG. 7(a), a preamble of the legacy PPDU includes a legacy short training field (L-STF), a legacy long training field (L-LTF), and a legacy signal field (L-SIG). In an embodiment of the present invention, the L-STF, the L-LTF, and the L-SIG may be referred to as a legacy preamble.

Referring to FIG. 7(b), a preamble of the HE PPDU additionally includes, in the legacy preamble, a repeated legacy short training field (RL-SIG), a high efficiency signal A field (HE-SIG-A), a high efficiency signal B field (HE-SIG-B), a high efficiency short training field (HE-STF), and a high efficiency long training field (HE-LTF). In an embodiment of the present invention, the RL-SIG, HE-SIG-A, the HE-SIG-B, the HE-STF and the HE-LTF may be referred to as an HE preamble. A specific configuration of the HE preamble may be modified according to an HE PPDU format. For example, HE-SIG-B may be used only in an HE MU PPDU format.

Referring to FIG. 7(c), a preamble of the EHT PPDU additionally includes, in the legacy preamble, a repeated legacy short training field (RL-SIG), a universal signal field (U-SIG), and an extremely high throughput signal A field (EHT-SIG-A), an extremely high throughput signal B field (EHT-SIG-B), an extremely high throughput short training field (EHT-STF), and an extremely high throughput long training field (EHT-LTF). In an embodiment of the present invention, the RL-SIG, EHT-SIG-A, the EHT-SIG-B, the EHT-STF and the EHT-LTF may be referred to as an EHT preamble. A specific configuration of a non-legacy preamble may be modified according to an EHT PPDU format. For example, EHT-SIG-A and EHT-SIG-B may be used only in a part of the EHT PPDU format.

64-FFT OFDM is applied in an L-SIG field included in the preamble of the PPDU, and the L-SIG field includes a total of 64 subcarriers. Among 64 subcarriers, 48 subcarriers excluding a guard subcarrier, a DC subcarrier, and a pilot subcarrier are used for transmission of L-SIG data. BPSK and a modulation and coding scheme (MCS) of rate=1/2 are applied in L-SIG, and therefore the L-SIG may include a total of 24 bits of information. FIG. 7(d) illustrates a 24-bit information configuration of L-SIG.

Referring to FIG. 7(d), the L-SIG includes an L_RATE field and an L_LENGTH field. The L_RATE field includes 4 bits and indicates an MCS used for data transmission. Specifically, the L_RATE field indicates one value among transmission rates of 6/9/12/18/24/36/48/54 Mbps obtained by combining a modulation scheme of BPSK/QPSK/16-QAM/64-QAM, etc. and an inefficiency of 1/2, 2/3, 3/4, etc. A total length of a corresponding PPDU may be indicated by combining information of the L_RATE field and information of the L_LENGTH field. In a non-legacy PPDU format, the L_RATE field is configured to a minimum rate of 6 Mbps.

A unit of the L_LENGTH field is a byte and a total of 12 bits are allocated to signal up to 4095, and a length of the PPDU may be indicated in combination with the L_RATE field. A legacy terminal and a non-legacy terminal may interpret the L_LENGTH field in different ways.

First, a method of interpreting the length of a PPDU using a L_LENGTH field by a legacy terminal or a non-legacy terminal is as follows. When the L_RATE field is set to 6 Mbps, 3 bytes (i.e., 24 bits) can be transmitted for 4 us, which is one symbol duration of 64 FFT. Therefore, by adding 3 bytes corresponding to the SVC field and the Tail field to the value of the L_LENGTH field and dividing it by 3 bytes, which is the transmission amount of one symbol, the number of symbols after the L-SIG is obtained on the 64 FFT basis. The length of the corresponding PPDU, that is, the reception time (i.e., RXTIME) is obtained by multiplying the obtained number of symbols by 4 us, which is one symbol duration, and then adding a 20 us which is for transmitting L-STF, L-LTF and L-SIG. This can be expressed by the following Equation 1.

$$RXTIME(us) = \left(\left\lceil \frac{L\_LENGTH + 3}{3} \right\rceil\right) \times 4 + 20 \quad \text{[Equation 1]}$$

In this case, denotes the smallest natural number greater than or equal to x. Since the maximum value of the L_LENGTH field is 4095, the length of the PPDU can be set up to 5.464 ms. The non-legacy terminal transmitting the PPDU should set the L_LENGTH field as shown in Equation 2 below.

$$L\_LENGTH(byte) = \left(\left\lceil \frac{TXTIME - 20}{4} \right\rceil\right) \times 3 - 3 \quad \text{[Equation 2]}$$

Herein, TXTIME is the total transmission time constituting the corresponding PPDU, and is expressed by Equation 3 below. In this case, TX represents the transmission time of X.

$$TXTIME(us) = T_{L-STF} + T_{L-LTF} + T_{L-SIG} + T_{RL-SIG} + T_{U-SIG} + (T_{EHT-SIG-A}) + (T_{ENT-SIG-B}) + T_{EHT-STF} + N_{EHT-LTF} \cdot T_{EHT-LTF} + T_{DATA} \quad \text{[Equation 3]}$$

Referring to the above equations, the length of the PPDU is calculated based on a rounded up value of L_LENGTH/3. Therefore, for a random value of k, three different values of L_LENGTH={3k+1, 3k+2, 3(k+1)} indicate the same PPDU length.

Referring to FIG. 7(e), a universal SIG (U-SIG) field continues to exist in an EHT PPDU and a WLAN PPDU of a subsequent generation, and serves to classify a generation of a PPDU, which includes 11be. U-SIG is a 64 FFT-based OFDM 2 symbol and may transfer a total of 52 bits of information. In 52 bits, 43 bits excluding 9 bits for CRC/Tail are largely divided into a version independent (VI) field and a version dependent (VD) field.

A VI bit enables a current bit configuration to be maintained even later on, so that even if a PPDU of a subsequent generation is defined, current 11be terminals may obtain information on the PPDU via the VI fields of the PPDU. To this end, the VI field includes PHY version, UL/DL, BSS color, TXOP, and reserved fields. The PHY version field is 3 bits, and serves to sequentially classify 11be and subsequent generation wireless LAN standards into versions. 11be has a value of 000b. The UL/DL field identifies whether the PPDU is an uplink/downlink PPDU. BSS color indicates an identifier for each BSS defined in 11ax, and has a value of 6 bits or more. TXOP indicates transmit opportunity duration transmitted in a MAC header, wherein, by adding the TXOP to a PHY header, the PPDU may infer a length of the TXOP included therein without having to decode an MPDU, and the TXOP has a value of 7 bits or more.

The VD field is signaling information useful only for an 11be version of the PPDU, and may include a field commonly used in any PPDU format, such as PPDU format and BW, and a field defined differently for each PPDU format. The PPDU format is a classifier that classifies EHT single user (SU), EHT multiple user (MU), EHT trigger-based (TB), EHT extended range (ER) PPDU, etc. The BW field signals five basic PPDU BW options (BW, which is expressible in the form of an exponential power of 20*2, may be referred to as basic BW) of 20, 40, 80, 160 (80+80), and 320 (160+160) MHz and various remaining PPDU BWs configured via preamble puncturing. After being signaled at 320 MHz, signaling may be performed in a form in which some 80 MHz is punctured. A punctured and modified channel type may be signaled directly in the BW field, or may be signaled using the BW field with a field (e.g., a field within the EHT-SIG field) appearing after the BW field. If the BW field is configured to 3 bits, a total of 8 BW signaling may be performed, and therefore only up to 3 signaling may be performed in a puncturing mode. If the BW field is configured to 4 bits, a total of 16 BW signaling may be performed, and therefore up to 11 signaling may be performed in the puncturing mode.

A field located after the BW field varies depending on the type and format of the PPDU, an MU PPDU and an SU PPDU may be signaled in the same PPDU format, a field for classification between the MU PPDU and the SU PPDU may be located before an EHT-SIG field, and additional signaling may be performed for the same. Both the SU PPDU and the MU PPDU include the EHT-SIG field, but some fields that are not required in the SU PPDU may be compressed. Information on the field to which the compression has been applied may be omitted or may have a size smaller than a size of an original field included in the MU PPDU. For example, in a case of the SU PPDU, a common field of the EHT-SIG may be omitted or replaced, or the SU PPDU may have a different configuration in which a user specific field is replaced, reduced to one, or the like.

Alternatively, the SU PPDU may further include a compression field indicating whether compression is performed, and a part of field (e.g., RA fields, etc.) may be omitted according to a value of the compressed field.

If a part of the EHT-SIG field of the SU PPDU is compressed, information to be included in the compressed field may be signaled also in an uncompressed field (e.g., the common field, etc.). The MU PPDU corresponds to a PPDU format for concurrent reception by multiple users, and therefore the EHT-SIG field is required to be transmitted subsequently to the U-SIG field, and the amount of signaled information may vary. That is, a plurality of MU PPDUs are transmitted to a plurality of STAs, so that the respective STAs should recognize locations of RUs, at which the MU PPDUs are transmitted, the STAs to which the RUs have been allocated respectively, and whether the transmitted MU PPDUs have been transmitted to the STAs themselves. Therefore, an AP should transmit information described above, by including the same in the EHT-SIG field. To this end, information for efficient transmission of the EHT-SIG field is signaled in the U-SIG field, and this may correspond to an MCS that is a modulation method and/or the number of symbols in the EHT-SIG field. The EHT-SIG field may include information on a size and location of an RU allocated to each user.

In the case of the SU PPDU, a plurality of RUs may be allocated to an STA, and the plurality of RUs may be continuous or discontinuous. If the RUs allocated to the STA are discontinuous, the STA should recognize a punctured RU in the middle in order to efficiently receive the SU PPDU. Accordingly, the AP may transmit the SU PPDU including information (e.g., a puncturing pattern of the RUs, etc.) of punctured RUs among the RUs allocated to the STA. That is, in the case of the SU PPDU, a puncturing mode field, which includes information indicating, in a bitmap format, etc., a puncturing pattern and whether the puncturing mode is applied, may be included in the EHT-SIG field, and the puncturing mode field may signal a discontinuous channel type appearing within a bandwidth.

The signaled discontinuous channel type is limited, and indicates discontinuous channel information and BW of the SU PPDU in combination with a value of the BW field. For example, the SU PPDU is a PPDU transmitted only to a single terminal, so that the STA may recognize a bandwidth allocated to itself via the BW field included in the PPDU, and the SU PPDU may recognize a punctured resource in the allocated bandwidth via the puncturing mode field of the EHT-SIG field or the U-SIG field included in the PPDU. In this case, the terminal may receive the PPDU in resource units remaining after excluding a specific channel of the punctured resource unit. The plurality of RUs allocated to the STA may be configured by different frequency bands or tones.

Only a limited discontinuous channel type is signaled in order to reduce signaling overhead of the SU PPDU. Puncturing may be performed for each 20 MHz sub-channel, so that if puncturing is performed for BW having a large number of 20 MHz sub-channels, such as 80, 160, and 320 MHz, a discontinuous channel (if puncturing of only edge 20 MHz is considered to be discontinuous) type should be signaled in the case of 320 MHz by expressing whether each of 15 20 MHz sub-channels remaining after excluding a primary channel is used. As such, allocating 15 bits to signal a discontinuous channel type of single user transmission may act as excessively large signaling overhead in consideration of a low transmission rate of a signaling part.

The present invention proposes a technique for signaling a discontinuous channel type of an SU PPDU, and illustrates a discontinuous channel type determined according to the proposed technique. The present invention also proposes a technique for signaling each of puncturing types of primary 160 MHz and secondary 160 MHz in a 320 MHz BW configuration of an SU PPDU.

An embodiment of the present invention proposes a technique for differently configuring a PPDU indicated by preamble puncturing BW values according to a PPDU format signaled in a PPDU format field. It is assumed that a BW field is 4 bits, and in a case of an EHT SU PPDU or a TB PPDU, EHT-SIG-A of 1 symbol may be additionally signaled after U-SIG, or EHT-SIG-A may not be signaled at all, so that, in consideration of this, it is necessary to completely signal up to 11 puncturing modes via only the BW field of U-SIG. However, in a case of an EHT MU PPDU, EHT-SIG-B is additionally signaled after U-SIG, so that up to 11 puncturing modes may be signaled in a method different from that of the SU PPDU. In a case of an EHT ER PPDU, a BW field may be configured to 1 bit to signal whether the EHT ER PPDU is a PPDU using a 20 MHz or 10 MHz band.

FIG. 7(f) illustrates a configuration of a format-specific field of a VD field when the EHT MU PPDU is indicated in the PPDU format field of U-SIG. In the case of the MU PPDU, SIG-B, which is a signaling field for concurrent reception by multiple users, is essentially required, and SIG-B may be transmitted without separate SIG-A after U-SIG. To this end, information for decoding of SIG-B should be signaled in U-SIG. These fields include SIG-B MCS, SIG-B DCM, Number of SIG-B Symbols, SIG-B Compression, and Number of EHT-LTF Symbols.

Figure 8:
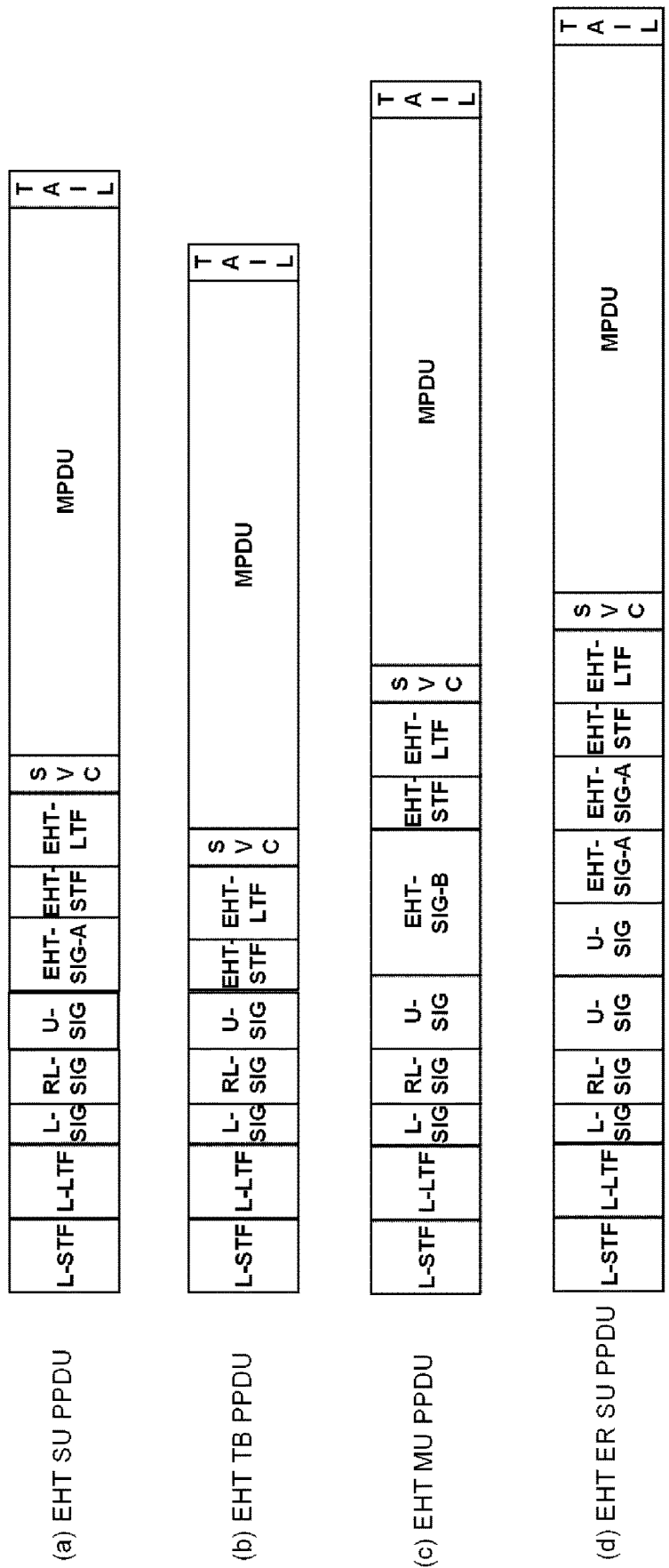
FIG. 8 illustrates an example of various extremely high throughput (EHT) physical protocol data unit (PPDU) formats and a method for indicating the same according to an embodiment of the present invention.

FIG. 8 illustrates an example of various extremely high throughput (EHT) physical protocol data unit (PPDU) formats and a method for indicating the same according to an embodiment of the present invention.

Referring to FIG. 8, a PPDU may include a preamble and a data part, and an EHT PPDU format, that is a PPDU type, may be classified according to a U-SIG field included in the preamble. Specifically, based on a PPDU format field included in the U-SIG field, whether the format of the PPDU is an EHT PPDU may be indicated.

FIG. 8(a) shows an example of an EHT SU PPDU format for a single STA. An EHT SU PPDU is a PPDU used for single user (SU) transmission between an AP and a single STA, and an EHT-SIG-A field for additional signaling may be located after the U-SIG field.

FIG. 8(b) shows an example of an EHT trigger-based PPDU format which corresponds to an EHT PPDU transmitted based on a trigger frame. An EHT Trigger-based PPDU is an EHT PPDU transmitted based on a trigger frame and is an uplink PPDU used for a response to the trigger frame. Unlike in the EHT SU PPDU, an EHT-SIG-A field is not located after a U-SIG field in the EHT PPDU.

FIG. 8(c) shows an example of an EHT MU PPDU format which corresponds to an EHT PPDU for multiple users. An EHT MU PPDU is a PPDU used to transmit the PPDU to one or more STAs. In the EHT MU PPDU format, an HE-SIG-B field may be located after a U-SIG field.

FIG. 8(d) shows an example of an EHT ER SU PPDU format used for single user transmission with an STA in an extended range. An EHT ER SU PPDU may be used for single user transmission with an STA of a wider range compared to the EHT SU PPDU described in FIG. 8(a), and a U-SIG field may be repeatedly located on a time axis.

The EHT MU PPDU described in FIG. 8(c) may be used by an AP to perform downlink transmission to a plurality of STAs. Here, the EHT MU PPDU may include scheduling information so that the plurality of STAs may concurrently receive the PPDU transmitted from the AP. The EHT MU PPDU may transfer, to the STAs, AID information of a transmitter and/or a receiver of the PPDU transmitted via a user specific field of EHT-SIG-B. Accordingly, the plurality of terminals having received the EHT MU PPDU may perform a spatial reuse operation based on the AID information of the user specific field included in a preamble of the received PPDU.

Specifically, a resource unit allocation (RA) field of the HE-SIG-B field included in the HE MU PPDU may include information on a configuration of a resource unit (e.g., a division form of the resource unit) in a specific bandwidth (e.g., 20 MHz, etc.) of a frequency axis. That is, the RA field may indicate configurations of resource units segmented in a bandwidth for transmission of the HE MU PPDU, in order for the STA to receive the PPDU. Information on the STA allocated (or designated) to each segmented resource unit may be included in the user specific field of EHT-SIG-B so as to be transmitted to the STA. That is, the user specific field may include one or more user fields corresponding to the respective segmented resource units.

For example, a user field corresponding to at least one resource unit used for data transmission among the plurality of segmented resource units may include an AID of a receiver or a transmitter, and a user field corresponding to the remaining resource unit(s) which is not used for data transmission may include a preconfigured null STA ID.

When one wireless communication device communicates by using a plurality of links, the communication efficiency of the wireless communication device may be increased. In this case, the link may be a physical path, and may consist of one wireless medium that may be used to deliver a MAC service data unit (MSDU). For example, in a case where frequency band of one of the links is in use by another wireless communication device, the wireless communication device may continue to perform communication through another link. As such, the wireless communication device may usefully use a plurality of channels. In addition, when the wireless communication device performs communication simultaneously by using a plurality of links, the overall throughput may be increased. However, in the existing wireless LAN, it has been stipulated that one wireless communication device uses one link. Therefore, a WLAN operation method for using a plurality of links is required. A wireless communication method of a wireless communication device using a plurality of links will be described through FIGS. 9 to 26. First, a specific form of a wireless communication device using a plurality of links will be described through FIG. 9.

Figure 9:
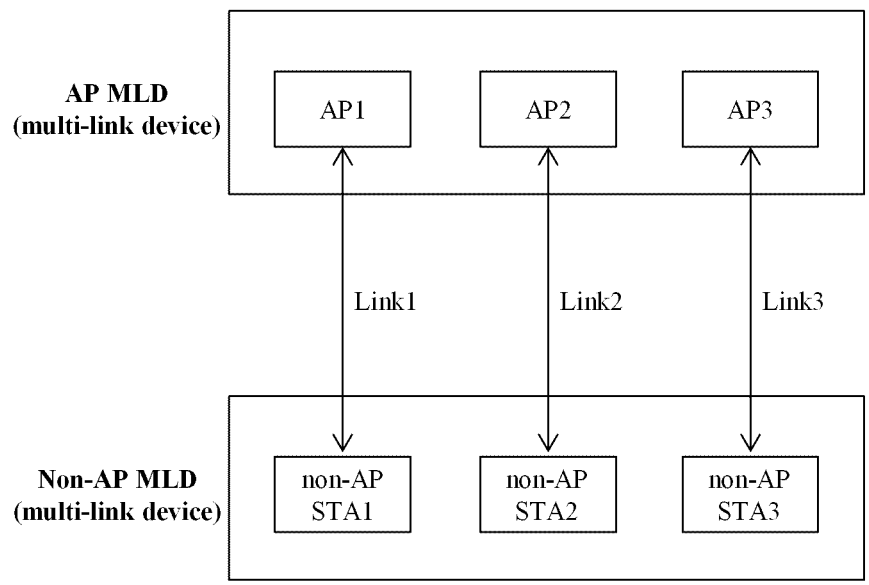
FIG. 9 illustrates a multi-link device according to an embodiment of the disclosure.

FIG. 9 illustrates a multi-link device according to an embodiment of the disclosure.

A multi-link device (MLD) may be defined for a wireless communication method using the plurality of links described above. The multi-link device may represent a device having one or more affiliated stations. According to a specific embodiment, the multi-link device may represent a device having two or more affiliated stations. In addition, the multi-link device may exchange multi-link elements. The multi-link element includes information on one or more stations or one or more links. The multi-link element may include a multi-link setup element, which will be described later. In this case, the multi-link device may be a logical entity. Specifically, the multi-link device may have a plurality of affiliated stations. The multi-link device may be referred to as a multi-link logical entity (MLLE) or a multi-link entity (MLE). The multi-link device may have one medium access control (MAC) service access point (SAP) up to logical link control (LLC). The MLD may also have one MAC data service.

A plurality of stations included in the multi-link device may operate on a plurality of links. In addition, a plurality of stations included in the multi-link device may operate on a plurality of channels. Specifically, the plurality of stations included in the multi-link device may operate on a plurality of different links or on a plurality of different channels. For example, a plurality of stations included in the multi-link device may operate on a plurality of different channels of 2.4 GHz, 5 GHz, and 6 GHz.

The operation of the multi-link device may be referred to as a multi-link operation, an MLD operation, or a multi-band operation. In addition, when the station affiliated with the multi-link device is an AP, the multi-link device may be referred to as the AP MLD. In addition, when the station affiliated with the multi-link device is a non-AP station, the multi-link device may be referred to as a non-AP MLD.

FIG. 9 illustrates an operation in which a non-AP MLD and an AP-MLD communicate. Specifically, the non-AP MLD and the AP-MLD communicate by using three links, respectively. The AP MLD includes a first AP AP1, a second AP AP2, and a third AP AP3. The non-AP MLD includes a first non-AP STA (non-AP STA1), a second non-AP STA (non-AP STA2), and a third non-AP STA (non-AP STA3). The first AP AP1 and the first non-AP STA (non-AP STA1) communicate through a first link Link1. In addition, the second AP AP2 and the second non-AP STA (non-AP STA2) communicate through a second link Link2. In addition, the third AP AP3 and the third non-AP STA (non-AP STA3) communicate through a third link Link3.

The multi-link operation may include a multi-link setup operation. The multi-link setup may correspond to an association operation of the single link operation described above and may be preceded first for frame exchange in the multi-link. The multi-link device may obtain information necessary for the multi-link setup from a multi-link setup element. Specifically, the multi-link setup element may include capability information associated with the multi-link. In this case, the capability information may include information indicating whether any one of the plurality of devices included in the multi-link device performs the transmission and simultaneously, another device may perform the reception. In addition, the capability information may include information on the links available to each station included in the MLD. In addition, the capability information may include information on the channels available to each station included in the MLD.

The multi-link setup may be set up through negotiation between peer stations. Specifically, the multi-link setup may be performed through communication between stations without communication with the AP. In addition, the multi-link setup may be set up through any one link. For example, even if the first link to the third link are set through the multi-link, the multi-link setup may be performed through the first link.

In addition, a mapping between a traffic identifier (TID) and a link may be set up. Specifically, frames corresponding to a TID of a particular value may only be interchanged through a pre-specified link. The mapping between the TID and the link may be set up with directional-based. For example, when a plurality of links is set up between the first multi-link device and the second multi-link device, the first multi-link device may be set to transmit a frame of the first TID to the plurality of first links, and the second multi-link device may be set to transmit a frame of the second TID to the first link. In addition, there may be a default setting for the mapping between the TID and the link. Specifically, in the absence of additional setup in the multi-link setup, the multi-link device may exchange frames corresponding to the TID at each link according to the default setting. In this case, the default setting may be that all the TIDs are exchanged in any one link.

Figure 10:
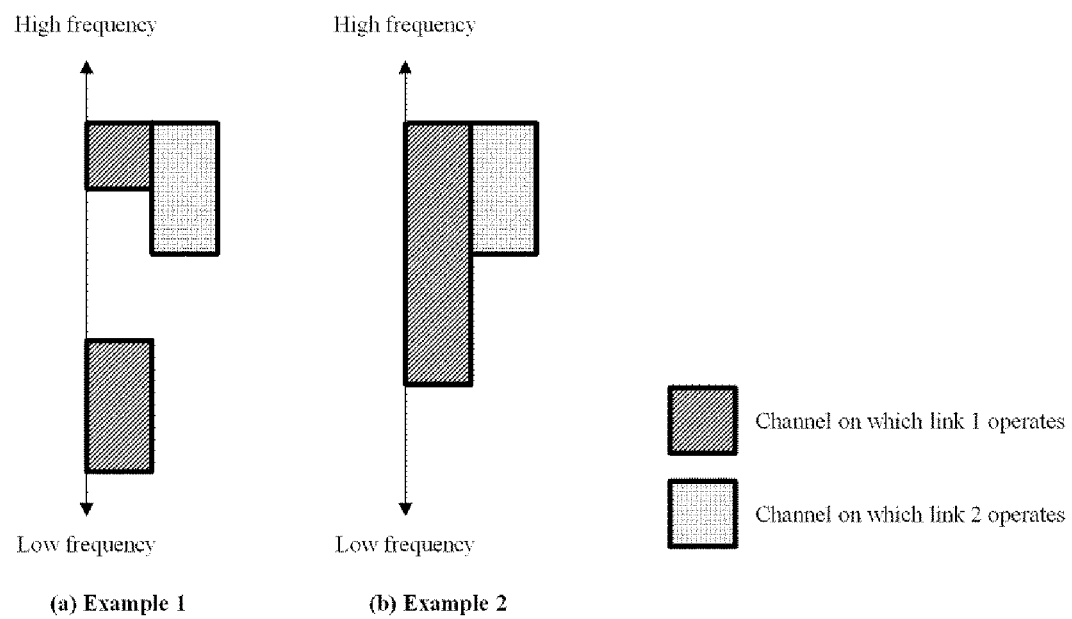
FIG. 10 illustrates the channelization of multi-link operation according to an embodiment of the disclosure.

FIG. 10 illustrates the channelization of multi-link operation according to an embodiment of the disclosure.

The channels of the plurality of links on which the multi-link device operates may overlap. In this case, the channel may be an operating channel. The operating channel may represent a channel through which the station may transmit or receive. In another specific embodiment, the operating channel may represent a channel that may be included in the link. The operating channel may represent a channel through which the beacon frame is transmitted. In another specific embodiment, the operating channel may also include a channel through which the beacon frame has not been transmitted. That is, the operating channel represents a channel in which the station may operate within the link, and may be independent of whether or not a beacon frame is transmitted. In another specific embodiment, the operating channel may represent any channel that the beacon frame is not transmitted but may be used in the multi-link. In another specific embodiment, the operating channel may include a channel indicating that the beacon frame is not transmitted but may be used in the multi-link. In addition, the channel may be a primary channel. In this case, the primary channel may be a 20 MHz primary channel. In addition, the channel may represent a channel on which the multi-link device may perform reception or transmission.

Overlapping channels may be set up in the multi-link setup. Specifically, in the multi-link setup, a channel of each of a plurality of links may be set up, and the channels of the plurality of links may be set to overlap. For example, the values representing the channels of the plurality of links may be the same. The multi-link setup element may include a subfield representing the operating band of each link. In this case, the subfield representing the operating band of each link may be at least one of 2.4 GHz, 5 GHz, and 6 GHz. The subfield representing the operating band of each link may be referred to as the Band ID subfield. The value of the Band ID subfield of the first link and the value of the Band ID subfield of the second link may be the same. Alternatively, the channel represented by the subfield representing the operating band of the first link and the channel represented by the subfield representing the operating band of the second link may overlap. In this case, the subfield representing the operating band may represent the center frequency and bandwidth of the channel available to each link. The plurality of links may operate flexibly even though the channels of the plurality of links overlap with each other. Therefore, even if the channels of the plurality of links overlap, the advantage of the multi-link that is applied during channel access can be maintained.

In FIGS. 10(a) and 10(b), the multi-link device may operate using the first link Link1 and the second link Link2. In FIG. 10(a), the first link Link1 may be set as a non-contiguous band. In this case, the channel of the first link Link1 and the channel of the second link Link2 may overlap with each other. In FIG. 10(b), the first link Link1 may be set as a contiguous band. In this case, the channel of the first link Link1 and the channel of the second link Link2 may overlap with each other.

Figure 11:
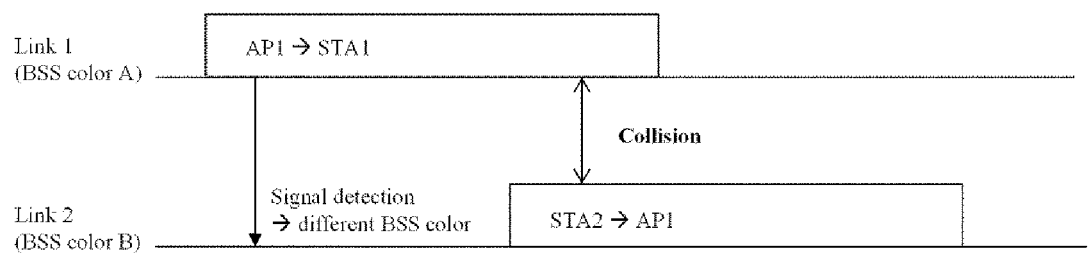
FIG. 11 illustrates a BSS color-based operation in a multi-link operation according to an embodiment of the disclosure.

FIG. 11 illustrates a BSS color-based operation in a multi-link operation according to an embodiment of the disclosure.

The BSSs of a plurality of links used in the multi-link operation may be different from each other. Specifically, the BSS colors corresponding to the plurality of links may be different from each other. In this case, the BSS color may be a BSS identifier. The BSS color may help the station determine from which BSS the PPDU received by the station has been transmitted. In a specific embodiment, the BSS colors corresponding to the plurality of links may be different from each other only when the channels on which the plurality of links operate do not overlap. In another specific embodiment, when each of the plurality of links has a different operating band, the BSS colors corresponding to the plurality of links may be different from each other. In this case, the band may be one of 2.4 GHz, 5 GHz, and 6 GHz. For example, when the first link of the multi-link device operates at 2.4 GHz and the second link operates at 5 GHz, the BSS color of the BSS corresponding to the first link and the BSS color of the BSS corresponding to the second link may be different.

Because the stations corresponding to the links may operate without receiving a signal received on the channel of other links when the channels of the links do not overlap, the BSSs of the plurality of links used in the multi-link operation may be different from each other, as in the embodiments described above. For example, the station might not need to receive a beacon frame on the channel on a link different from the link to which the station corresponds. When the plurality of BSS colors corresponding to the plurality of links are different from each other, the plurality of BSSs corresponding to the plurality of links may operate independently. Accordingly, when a plurality of BSS colors corresponding to a plurality of links are different from each other, the implementation of a multi-link device may be facilitated. When the BSS colors of the plurality of links of the multi-link device are all the same, the range of BSS colors that may be assigned to the links may be limited. In addition, when the BSS colors of the plurality of links of the multi-link device are all the same, communication between the links may be required or each station may require additional memory. In addition, unlike the embodiments described above, when the channels of the plurality of links of the multi-link device overlap with each other and the BSS colors of the plurality of links are the same, a transmission conflict may be likely to occur.

In FIG. 11, the first AP AP1 of the multi-link device may communicate with the first station STA1 through the first link Link1. In addition, the second AP AP2 of the multi-link device may communicate with the second station STA2 through the second link Link2. The BSS color of the first link Link1 may be A, the BSS color of the second link Link2 may be B, and the BSS color of the first link Link1 and the BSS color of the second link Link2 may be different. Depending on the situation, for example, when the channel of the first link Link1 and the channel of the second link Link2 overlap with each other, the second station STA2 may receive the PPDU transmitted by the first AP AP1. Since the BSS color of the PPDU transmitted by the first AP AP1 is A, the second station STA2 may perform channel access by regarding the PPDU transmitted by the first AP AP1 as an Inter-BSS PPDU. Specifically, while the PPDU transmitted by the first AP AP1 is transmitted, the second station STA2 may perform channel access using a threshold value lower than the typical CCA threshold value. This may result in a transmission conflict. For example, while the PPDU transmitted by the first AP AP1 is transmitted, the second station STA2 may transmit the PPDU to the second AP AP2, and the PPDU transmitted by the first AP AP1 and the PPDU transmitted by the second AP AP2 may collide.

In a multi-link operation, the station may consider the plurality of BSS colors as a BSS to be protected. Specifically, the station may determine that the BSSs corresponding to the plurality of BSS colors are intra-BSSs. The station may not perform a spatial reuse (SR) operation for the BSSs corresponding to the plurality of BSS colors. In a specific embodiment, the station may determine that the plurality of BSS colors are the same as the BSS colors of the BSSs to which the station belongs. When the BSS color of the PPDU received by the station is the same as one of the plurality of BSS colors, the station may determine the PPDU as the intra-PPDU. In addition, when the BSS color of the PPDU received by the station is the same as one of the plurality of BSS colors, the station may not perform the SR operation on the received PPDU. In the embodiments described above, the plurality of BSS colors may be a plurality of BSS colors corresponding to the plurality of links of the multi-link device to which the station is affiliated. In addition, the plurality of BSS colors may be a plurality of BSS colors corresponding to the plurality of links of the multi-link device to which a station-coupled station is affiliated. The embodiments described above may be applied not only to BSS color but also to BSSID determination and MAC address determination. The MAC address may include at least one of receiving address (RA), a transmitting address (TA), and a BSSID.

Figure 12:
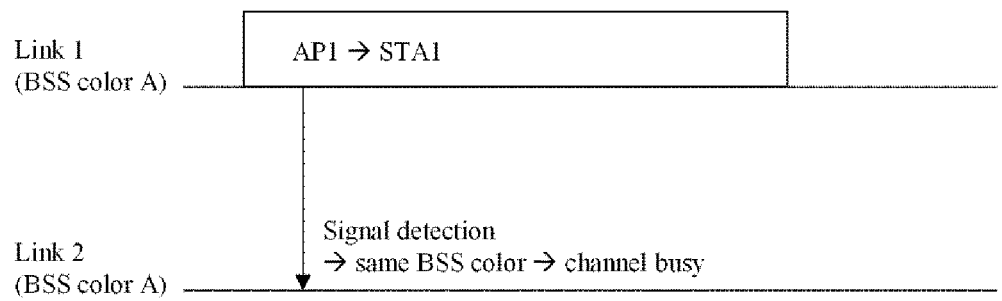
FIG. 12 illustrates a method of setting a BSS color corresponding to each of the plurality of multi-link in a multi-link operation according to another embodiment of the disclosure.

In another specific embodiment, the multiple links used in the multi-link operation may be set to the same BSS. This will be described through FIG. 12. FIG. 12 illustrates a method of setting a BSS color corresponding to each of a plurality of links in a multi-link operation according to another embodiment of the disclosure.

The BSSs of the plurality of links used in the multi-link operation may be the same as each other. Specifically, the BSS colors corresponding to a plurality of links may be the same as each other. In a specific embodiment, only when the channels on which the plurality of links operate overlap with each other, the BSS colors corresponding to the plurality of links may be the same as each other. For example, in the case of FIG. 10, the BSS color of the BSS corresponding to the first link Link1 and the BSS color of the BSS corresponding to the second link Link2 may be the same. In another specific embodiment, when each of the plurality of links has the same operating band, the BSS colors corresponding to the plurality of links may be the same as each other. In this case, the band may be one of 2.4 GHz, 5 GHz, and 6 GHz. For example, when the first link of the multi-link device operates at 2.4 GHz and the second link operates at 5 GHz, the BSS color of the BSS corresponds to the first link, and the BSS color of the BSS corresponding to the second link may be the same. This is because when the channels of different links overlap or when different links operate in the same band, the station may receive PPDUs transmitted from the other links, and the main channel of the stations may overlap with the channels of other links.

In FIG. 12, the multi-link device may operate on the first link Link1 and the second link Link2. The first AP AP1 of the multi-link device may communicate with the first station STA1 through the first link (Link 1). The BSS color of the first link Link1 and the BSS color of the second link Link2 may be A. Depending on the situation, for example, when the channel of the first link Link1 and the channel of the second link Link2 overlap with each other, the PPDU transmitted by the first AP AP1 may be received by the station operating on the second link Link2. Because the BSS color of the PPDU transmitted by the first AP AP1 is A, the second station STA2 may not perform channel access by considering the PPDU transmitted by the first AP (AP1) as an Intra-BSS PPDU. Specifically, while the PPDU transmitted by the first AP (AP1) is transmitted, the second station STA2 may determine that the channel is busy. Alternatively, the second station STA2 may set the NAV, based on the PPDU transmitted by the first AP AP1. The embodiments described above may be applied not only to the BSS color but also to the BSSID determination and MAC address determination. The MAC address may include at least one of receiving address (RA), a transmitting address (TA), and a BSSID. Specifically, the BSSIDs of the BSS corresponding to the plurality of links on which the multi-link device operates may be the same as each other.

When following the embodiment described in FIG. 12, conflicts that occur between the transmissions of the different links described above may be prevented. However, when the BSS color is changed, the BSS colors of the plurality of BSSs need to be changed together. Therefore, the efficiency of the operation may be reduced when the BSS color is changed.

In another specific embodiment, the preamble of the PPDU may include an identifier of the links. In this speci-fication, the preamble may indicate a signaling field. In addition, the signaling field may represent a preamble. Specifically, when the BSS colors of the BSSs corresponding to the plurality of links are the same as each other, the preamble of the PPDU may include an identifier of the links. In this case, the station may determine from which link the PPDU is transmitted even if the BSS colors of the BSSs corresponding to the plurality of links are the same, as in the embodiments described in FIG. 11. In addition, the station may stop receiving the PPDU, based on the identifier of the links included in the preamble of the PPDU. In addition, the station may perform a power save operation, based on the identifier of the links included in the preamble of the PPDU. In addition, the station may access the channel, based on the identifier of the links included in the preamble of the PPDU.

Figure 13:
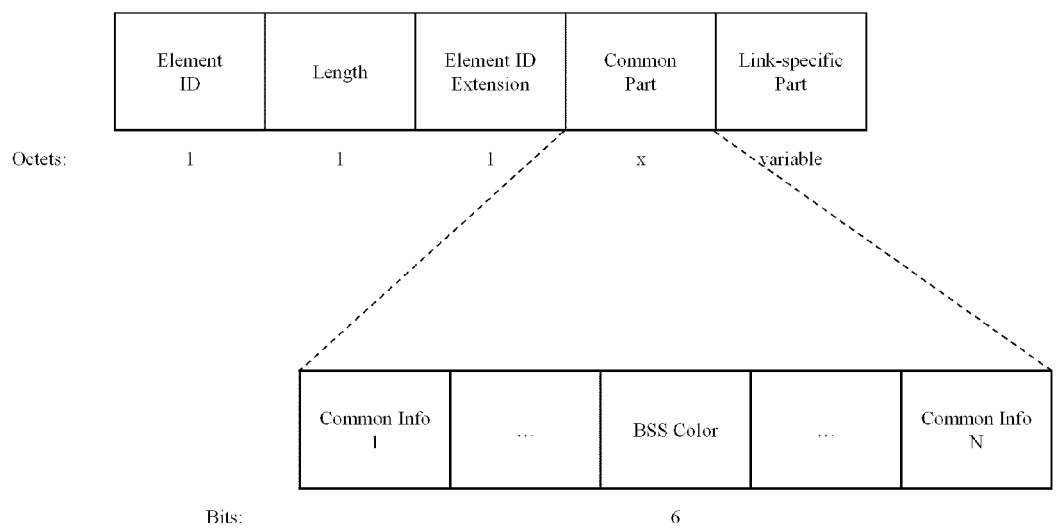
FIG. 13 illustrates a multi-link setup element according to an embodiment of the disclosure.

FIG. 13 illustrates a multi-link setup element according to an embodiment of the disclosure.

The multi-link setup element may include a common part and a link-specific part. The common part may include information corresponding to all of the links that the multi-link setup element signals. The link-specific part may independently include information corresponding to each of the plurality of link signaled. The length of the common part may be preset. In addition, the length of the link-specific part may be a multiple of a preset length. Specifically, the length of the link-specific part may be a value obtained by multiplying a preset length by the number of links signaled by the multi-link setup element.

The link-specific part of the multi-link setup element may include information about the operating channel for the one or more links signaled by the multi-link setup element. Specifically, the information about the operating channel may include the width of the operating channel and the center frequency. In this case, the number of the center frequency may be 2 or more. The meaning of the center frequency may vary according to the width of the operating channel. Specifically, when the channel width of the channel is equal to or greater than a certain size, the channel may be separated into a plurality of segments and the center frequency may represent the center frequency of each segment. Alternatively, when the channel width of the channel is equal to or greater than a certain size or discontinuous, the channel may be separated into a plurality of segments and the center frequency may represent the center frequency of each segment. When the width of the operating channel is 320 MHz or is discontinuous and consists of two segments with a width of 160 MHz, the center frequency may represent the center frequency of each of the two segments having a width of 160 MHz. In addition, when the operating channel is composed of one segment with a width of 240 MHz or a discontinuous and 160 MHz width and one segment with a width of 80 MHz, the center frequency may represent a center frequency of each of a segment having a width of 160 MHz and a segment having a width of 80 MHz.

The multi-link setup element may include a BSS color field indicating one BSS color commonly applied to a plurality of links signaled by the multi-link setup element. Specifically, the multi-link setup element may include the BSS color field indicating one BSS color commonly applied to the plurality of links signaled by the multi-link setup element in the common part. When the embodiment described in FIG. 12 is applied, such a multi-link setup element may be used.

Figure 14:
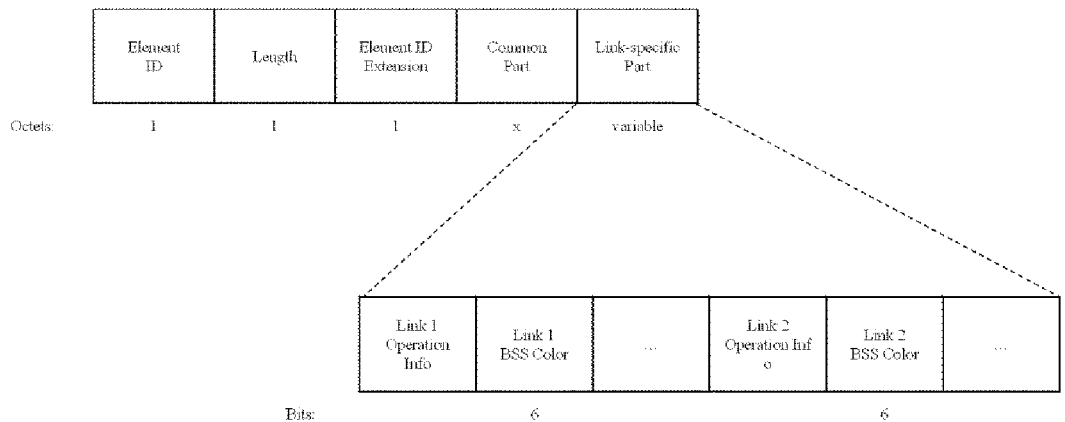
FIG. 14 illustrates a multi-link setup element according to another embodiment of the disclosure.

FIG. 14 illustrates a multi-link setup element according to another embodiment of the disclosure.

In another specific embodiment, the multi-link setup element may include one or more BSS color fields representing the BSS colors applied to each of the one or more links signaled by the multi-link setup element. In this case, the other configuration of the multi-link setup element may be the same as in the embodiment described in FIG. 13. Specifically, the multi-link setup element may include one or more BSS color fields representing the BSS colors applied to each of the one or more links signaled by the multi-link setup element to the link-specific part. Specifically, the multi-link setup element may include a link-specific BSS color field in the link-specific part.

The values of the one or more BSS color fields may be the same as each other. Specifically, as in the embodiments described above, when the BSS colors of the BSSs corresponding to a plurality of links are the same as each other, the values of the one or more BSS color fields may be the same as each other. In a specific embodiment, when the channels of the plurality of links on which the multi-link device operates overlap with each other, the values of the BSS color fields corresponding to the plurality of links may be the same as each other. In another specific embodiment, when the bands of the plurality of links on which the multi-link device operates are the same as each other, the values of the BSS color fields corresponding to the plurality of links may be the same as each other. In this case, the bands may be one of 2.4 GHz, 5 GHz, and 6 GHz. For example, when the first link of the multi-link device operates at 2.4 GHz and the second link operates at 5 GHz, the value of the BSS color field corresponding to the first link and the value of the BSS color field corresponding to the second link may be the same.

The values of one or more BSS color fields may be different from each other. Alternatively, the values of the one or more BSS color fields may be determined independently. Specifically, as in the embodiments described above, when the BSS colors of the BSSs corresponding to the plurality of links are different, the values of the one or more BSS color fields may be different from each other. In a specific embodiment, when the plurality of links on which the multi-link device operates do not overlap, the values of the BSS color fields corresponding to the plurality of links may be different from each other. In another specific embodiment, when the band of the plurality of links on which the multi-link device operates are different from each other, the values of the BSS color fields corresponding to the plurality of links may be different from each other. In this case, the band may be one of 2.4 GHz, 5 GHz, and 6 GHz. For example, when the first link of the multi-link device operates at 2.4 GHz and the second link operates at 5 GHz, the value of the BSS color field corresponding to the first link and the value of the BSS color field corresponding to the second link may be different from each other.

In the embodiments described above, different BSS colors may be assigned to the plurality of links in which the multi-link device operates. In addition, the non-AP multi-link device may transmit a trigger-based PPDU in response to the trigger frame through a link different from that on which the trigger frame is received. In this case, a method of setting the BSS color of the trigger-based PPDU may be problematic. In a specific embodiment, the station may set the BSS color of the trigger-based PPDU to the BSS color of the BSS of the link transmitting the trigger-based PPDU, regardless of the BSS color of the PPDU including the trigger frame. According to this embodiment, the BSS color of the PPDU including the trigger frame and the BSS color of the trigger-based PPDU transmitted in response to the trigger frame may vary. In this case, the station may set the BSS COLOR value of the TXVECTOR parameter to the BSS color of the BSS of the link transmitting the trigger-based PPDU to set the BSS color of the trigger-based PPDU. The TXVECTOR parameter may be an interface of information transmitted from the MAC layer to the physical (PHY) layer. The trigger-based PPDU may be the EHT TB PPDU described above.

Figure 15:
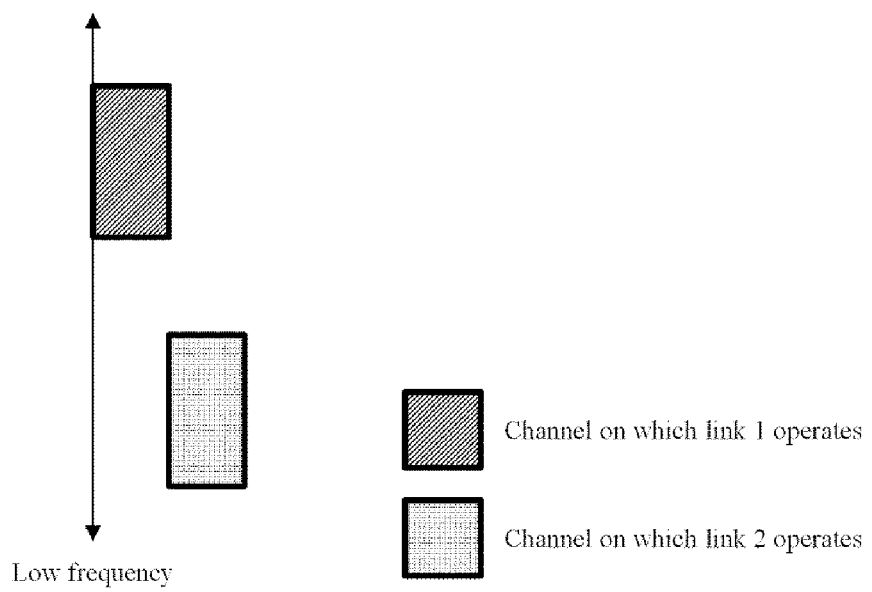
FIG. 15 illustrates the channelization of multi-link operation according to another embodiment of the disclosure.

FIG. 15 illustrates the channelization of a multi-link operation according to another embodiment of the disclosure.

The channels of the plurality of links on which the multi-link device operates may not overlap. In this case, the channel may be the same as the channel illustrated in the embodiment described in FIG. 10.

The channels may be set not to overlap in the multi-link setup. Specifically, in the multi-link setup, a channel of each of a plurality of links may be set up, and the channels of the plurality of links may be set up not to overlap with each other. For example, the values representing the channels of the plurality of links may not be allowed to be the same. As described above, the multi-link setup element may include a subfield representing the operating band of each link. In this case, the subfield representing the operating band of each link may represent at least one of 2.4 GHz, 5 GHz, and 6 GHz. In this case, the subfield representing the operating band of each link may be referred to as the Band ID subfield. The value of the Band ID subfield of the first link and the value of the Band ID subfield of the second link may not be allowed to be the same. Alternatively, the channel represented by the subfield representing the operating band of the first link and the channel represented by the subfield representing the operating band of the second link may not be allowed to overlap with each other. In this case, the subfield representing the operating band may represent the center frequency and bandwidth of the channel available for each link. In this way, by limiting the channel setting of the link, problems that may occur when channels of different links overlap, for example, transmission collision, inefficiency of channel access, etc. can be solved.

FIG. 15 illustrates that the channel of the link of the multi-link device is set according to these embodiments. In FIG. 15, the multi link device operates at the first link 1 and the second link 2. 15, the first link 1 and the second link 2 operate in different bands.

Figure 16:
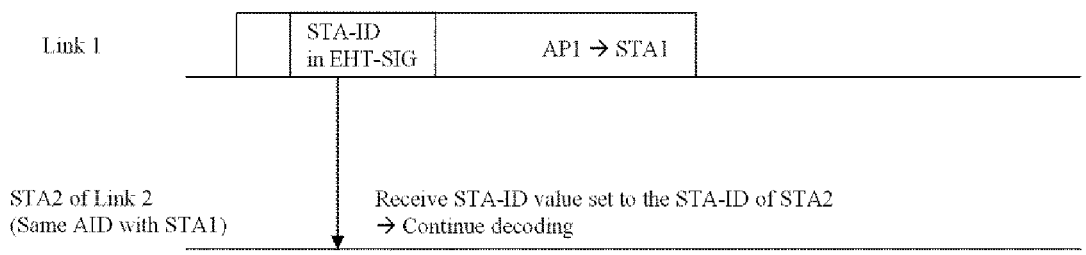
FIG. 16 illustrates a method of configuring the identifier of a station in a multi-link operation according to an embodiment of the disclosure.

FIG. 16 illustrates a method of setting the identifier of a station in a multi-link operation according to an embodiment of the disclosure.

According to an embodiment of the disclosure, an association ID (AID) may be assigned for each link in the multi-link operation. Specifically, the AID of a station operating on a link may be assigned within the AID space of a station operating on the link. The range of values of the AID space for each link may be the same as each other. Accordingly, the station of the first link and the station of the second link may have the same AID as each other. This AID assignment may be performed in a multi-link setup.

The signaling field of the EHT PPDU may include an STA-ID field. The STA-ID field may represent information about a station receiving the EHT PPDU. Specifically, the STA-ID field may represent information about the recipient or intended recipient of the EHT PPDU. The STA-ID field may be set to the recipient's AID of the EHT PPDU or partial value of AID. The STA-ID field may be set to 11 least significant bits (LSBs) of the recipient of the EHT PPDU. Alternatively, the STA-ID field may be set to a value representing the group in which the station is included. Alternatively, the STA-ID field may be set to a value representing a broadcast. In addition, the STA-ID field may be included in the EHT-SIG field described above. Alternatively, the STA-ID field may be included in the U-SIG field described above.

The station may set the value of the TXVECTOR parameter STA_ID to set the STA-ID field of the EHT PPDU. In addition, the RXVECTOR parameter may be a value transferred from a PHY layer to a MAC layer. The station may obtain the value of the STA-ID field of the EHT PPDU as the value of the STA_ID of the RXVECTOR parameter. The RXVECTOR may represent an interface that connects the MAC layer and the PHY layer, like TXVECTOR.

As in some embodiments described above, in the multi-link operation, the channels of the links may overlap with each other. In this case, when the AIDs of the stations operating on different links overlap, there may be crosstalk in the station operation. In FIG. 16, the multi-link device operates at the first link Link1 and the second link Link2. In this case, the first station STA1 may operate on the first link Link1, and the second station STA2 may operate on the second link Link2. According to the embodiment described above, the AID of the first station STA1 and the AID of the second station STA2 may be assigned as the same value. When the EHT PPDU transmitted to the first station STA1 is received by the second station STA2, the second station STA2 may determine that the received PPDU is the PPDU transmitted to the second station STA2. Accordingly, the second station STA2 may continue to decode the received PPDU. This may cause the second station STA2 to perform unnecessary decoding, and may not be able to enter the power save operation. Accordingly, inefficiencies may occur in channel access and power saving.

In another specific embodiment, the AID of the station operating on each link in the multi-link operation may be assigned dependent on other links in the multi-link. Specifically, the AID of the station operating on each link of the multi-link may be assigned within one AID space. Through this, the AIDs of the stations operating on the different links of the multi-link may be assigned not to overlap with each other. AID assignment may be performed in the multi-link setup. In addition, such embodiments may be applied when the channels of the links may overlap in the multi-link operation. Specifically, when the channels of the links may overlap in the operation of the multi-link, the AID of the station operating on each link of the multi-link may be assigned within one AID space. When the channels of the links may overlap in the operation of the multi-link, the bands of the multi-link may be the same as each other. The band of the multi-link may be one of 2.4 GHz, 5 GHz, and 6 GHz. For example, it may be the case that the band of the first link is 2.4 GHz, and the band of the second link is also 2.4 GHz.

By assigning BSS colors for each link, the problem described above may be solved. As described above, different BSS colors may be assigned to a plurality of links in the multi-link operation. The signaling field of the EHT PPDU described above may include a BSS color. Specifically, the U-SIG field of the EHT PPDU may include a BSS color. When the BSS colors of the plurality of links in the multi-link operation are different, even if the identifiers of the stations of different links, that is, the values of the STA-ID fields, are the same, the station receiving the PPDU may determine from which link the PPDU was transmitted. Accordingly, unnecessary decoding of the station may be prevented without any restriction on the identifier of the station.

In addition, through the assignment of the identifiers for each link, the above-described problem may be solved. In a specific embodiment, the signaling field of the EHT PPDU described above may include identifiers of the links. In addition, some the identifiers of the station, i.e., the values of the STA-ID fields may represent the identifiers of the links. When the BSS colors of the plurality of links of the multi-link operation are different, even if the identifiers of the stations of the different links, that is, the values of the STA-ID fields are the same, the station receiving the PPDU may determine from which link the PPDU was transmitted. Accordingly, unnecessary decoding of the station may be prevented without any restriction on the identifiers of the station.

In the above-described embodiments, AID has been described as the identifier of the station. However, the identifier of the station is not limited thereto, and a value different from the AID may be used as the identifier of the station.

Figure 17:
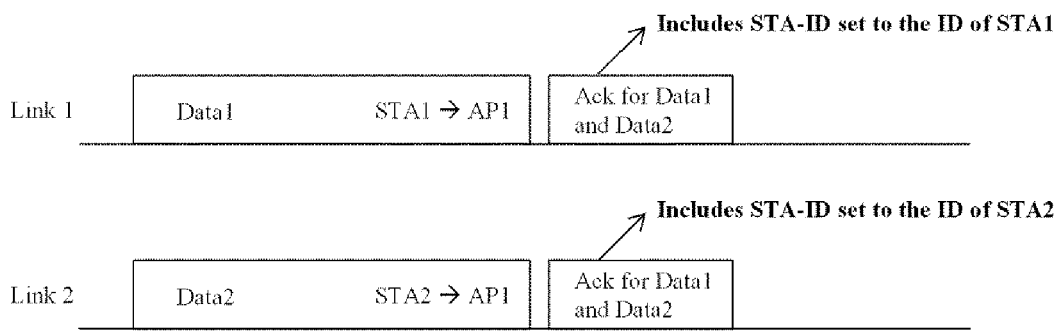
FIG. 17 illustrates an ACK process in a multi-link operation according to an embodiment of the disclosure.

FIG. 17 illustrates an ACK process in the multi-link operation according to an embodiment of the disclosure.

In the multi-link operation, the plurality of links may share a sequence number space. Specifically, the plurality of links may manage the sequence numbers of the frames together. In addition, in the multi-link operation, the plurality of links may share the receiving reorder buffer. The multi-link device may exchange data generated from one sequence number space over the plurality of links. In addition, the multi-link device may transmit a reception status for the data, e.g., an ACK, over another link as well as the link on which the data was transmitted.

In FIG. 17, the first station STA1 of the multi-link device operates on the first link Link1, and the second station STA2 of the multi-link device operates on the second link Link2. The multi-link device may transmit an ACK for the data received through the first link Link1 together with an ACK for the data received through the second link Link2. For example, an AP multi-link device may receive the first data Data1 from the first station STA1 through the first link Link1 and may receive the second data Data2 from the second station STA2 through the second link Link2. In this case, the AP multi-link device may transmit the ACK for the first data Data1 together with the ACK for the second data Data2 through the first link Link1. In addition, the multi-link device may transmit the ACK for the first data Data1 together with the ACK for the second data Data2 through the second link Link2. For example, the multi-link device may transmit a BlockAck frame that includes the ACK for the first data Data1 and the ACK for the second data Data2 through the second link Link2. In this way, in order to transmit the ACKs for the data transmitted by the plurality of stations together, the identifiers of the station transmitting the data may need to be transmitted together. In this case, the values of the fields representing the identifiers of the station in the BlockAck frame may be set as the identifier of the first station STA1 and the identifier of the second station STA2.

In a specific embodiment, the multi-link device may set the identifier of the station as the identifier of the station corresponding to the link on which the PPDU or MAC frame including the identifier of the station is transmitted. For example, the multi-link device may obtain the identifier of the station represented by the signaling field of the MAC frame or PPDU received by the multi-link device, and may set the identifier of the obtained station as the identifier of the station corresponding to the MAC frame or the link to which the PPDU is transmitted.

In the embodiments described above, the identifier of the station may be included in the BlockAck frame. Specifically, the identifier of the station may be included in one of the BlockAck frame, a multi-TID BlockAck frame, and a multi-STA BlockAck frame.

According to the embodiments, even if the identifier of the station of the BlockAck frame is set, when the channels of the plurality of links of the multi-link operation overlap with each other, it is possible to cause confusion in the operation of the station.

The identifiers of all stations affiliated with one multi-link device may be the same as each other. Specifically, the AIDs of all stations affiliated with one multi-link device may be the same as each other. Accordingly, the station identifier of the PPDU or MAC frame including the MAC frame transmitted to the station included in one multi-link device may be set to one value. Such embodiments may be applied in limited cases where the channels of the plurality of links of the multi-link operation may overlap with each other.

In another specific embodiment, a representative identifier representing a plurality of stations affiliated with the multi-link device may be assigned separately, and an identifier for each of the plurality of stations may be assigned separately. In this case, the station may set the identifier of the station as a representative identifier when transmitting an ACK for the data frame. Specifically, the identifiers of each station maybe two or more. In this case, one of the two or more identifiers may be an identifier identifying the station, the identifier of the other one of the two or more identifiers may be an identifier identifying a plurality of stations, including stations. In addition, the two or more identifiers may further include identifiers that identify all stations affiliated with the multi-link device. Such embodiments may be limited to the case where the channels of the plurality of links of the multi-link operation may overlap with each other.

In addition, when the station transmits a frame to a station affiliated with the multi-link device, the station may set the station identifier of the PPDU including the frame or frame as a representative identifier. In addition, the representative identifier may be one of a broadcast identifier and a group identifier. Such embodiments may be limited to a case where the channels of the plurality of links of the multi-link operation may overlap with each other.

In another specific embodiment, when a station transmits a MAC frame to a station affiliated with the multi-link device, the station may use a PPDU format that does not include user information. The PPDU format that does not include user information may be a non-HT PPDU or a non-HT duplicate PPDU. In another specific embodiment, when a station transmits a MAC frame to the station affiliated with a multi-link device, the station may use a PPDU format other than the EHT PPDU format. Such embodiments may be restrictively applied to a case where the channels of the plurality of links of the multi-link operation may overlap with each other.

In the embodiments described above, transmitting a MAC frame to the station affiliated with the multi-link device may also include transmitting an ACK to the station affiliated with the multi-link device.

In order to explain the embodiments described above, the identifier of the station included in the PPDU or MAC frame is described by way of example. In particular, the identifier of the station included in the MAC frame including the signaling field and ACK of the PPDU has been described. The embodiments described above may also be applied to the identifier of the station used to indicate the relationship of the station to the resource unit (RU) and the station.

Figure 18:
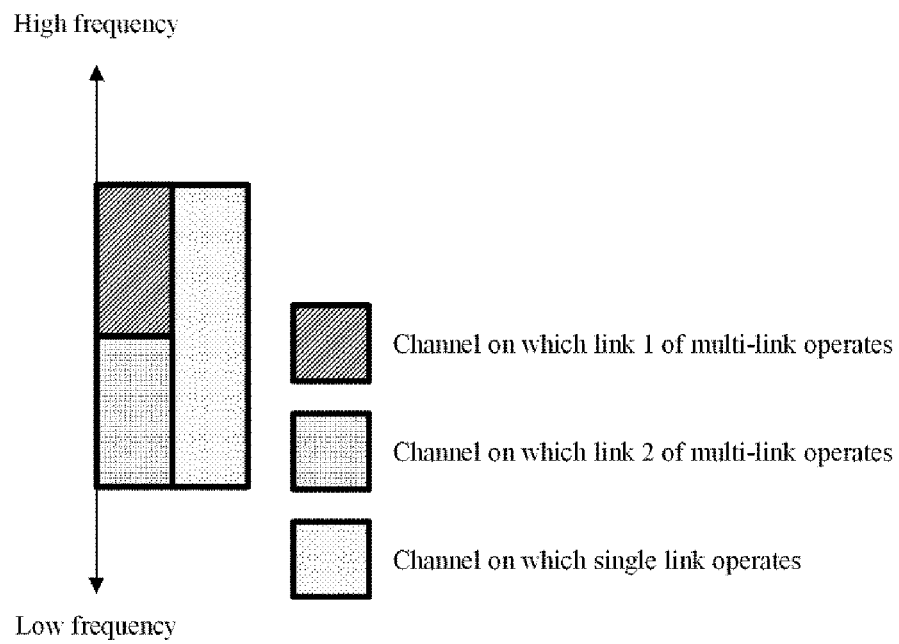
FIG. 18 illustrates the channel configuration according to an embodiment of the disclosure.

FIG. 18 illustrates the channel setting according to an embodiment of the disclosure.

An AP multi-link device, an AP, or an AP device may set a plurality of links. The AP multi-link device, the AP, or the AP device may communicate through a plurality of links. In this case, the AP device may represent a physical device including an AP. In addition, a non-AP multi-link device or a non-AP STA may communicate over through plurality of links. The multi-link device may perform a multi-link operation as described above. However, there may also be a station that cannot perform the multi-link operation and cannot perform a single link operation. For example, an EHT multi-link device may perform either a multi-link operation or a single link operation. In addition, an EHT station, a legacy station, such as an HE station, a VHT station, a HT station, and an 11a/b/g station may perform only a single link operation. The AP may set multi-link and a single link. In addition, the multi-link may be composed of a plurality of single links. Depending on the setting of the link, the channels used by the multi-link and the channel of the single link may overlap. Specifically, the channels of the multi-link and the channel of the single link may overlap, or the channel of one link of the multi-link and the channel of the single link may overlap. In addition, two or more channels used by the multi-link and the single-channel may overlap.

The channel setting may be set through an operation element. Specifically, the operation element may set channels such that the channel of the single link and the channels of the multi-link overlap with each other, as described above. The operation element may include information about at least one of a channel bandwidth, a channel number, and a center frequency.

The multi-link and the single link described above may be links operated or set by one AP, one AP multi-link device, or one AP device. On the premise of this, the specific embodiment of the disclosure will be described.

In FIG. 18, the first channel and the second channel of the multi-link, and the channel of the single link may overlap with each other. In the case of FIG. 18, the channel of a single link may be a contiguous channel, or a single channel may be a non-contiguous channel.

Figure 19:
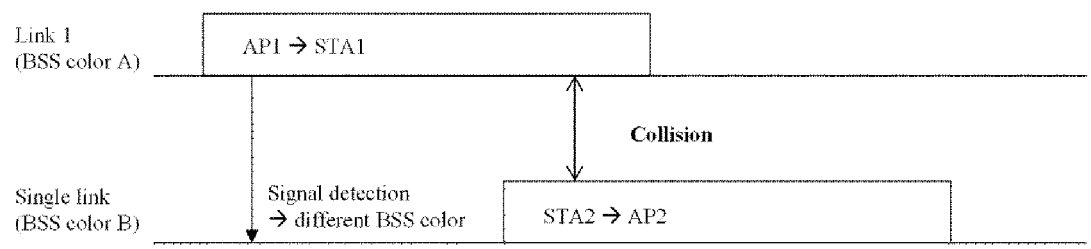
FIG. 19 illustrates an operation of a station in a case where a multi-link and a single link are configured according to an embodiment of the disclosure.

FIG. 19 illustrates the operation of the station when a multi-link and a single link are set according to an embodiment of the disclosure.

As described in FIG. 18, when the channels of the multi-link and the channel of the single link overlap, the station operating on a multi-link operated by the same AP as the single link may receive a frame transmitted from the single link. In addition, the station operating on a single link operated by the same AP as the multi-link may receive a frame transmitted from the multi-link.

In addition, the BSS color of the BSS of the single link and the BSS color of the BSS of the multi-link may be assigned independently. Specifically, as in the embodiments described with reference to FIG. 11, the BSS color of each of the BSS of the multi-link may be assigned independently. In such an embodiment, the BSS color of the BSS of the single link and the BSS color of the BSS of the multi-link may be set differently. In FIG. 19, the BSS color of the BSS of the first link Link1 of the multi-link operated by the AP multi-link device may be assigned A. In addition, the BSS color of the BSS of the single link operated by the AP multi-link device may be assigned B. The second station STA2 communicating with the second AP AP2 of the multi-link device may receive the PPDU transmitted by the first AP AP1 of the AP multi-link device operating in the first link Link1. Because the BSS color of the PPDU transmitted by the first AP AP1 and the BSS color of the BSS of the single link are different, the second station STA2 may perform the SR operation. In particular, the second station STA2 may ignore the PPDU transmitted by the first AP AP1, and may perform the transmission. This may result in a transmission conflict. In addition, when the second station STA2 performs an SR operation of the first AP AP1 or the first station STA1 while performing transmission, a transmission collision may occur.

The BSS color of the BSS of the single link operated by one AP multi-link device and the BSS color of all BSS of the multi-link may be assigned the same value. The BSS color of the BSS of the single link operated by one AP multi-link device and the BSS color of the BSS of at least one link of the multi-link may be assigned the same value. Specifically, when the channel of the single link operated by the one AP multi-link device and the channel of the multi-link overlap with each other, the BSS color of the BSS of the multi-link having the overlap channel and the BSS color of the BSS of the single link may be assigned the same value.

In another specific embodiment, the station may consider the BSS color of the BSS of the multi-link and the BSS color of the BSS of the single link to be the same. Specifically, the station operating on a single link may determine that the BSS color of the BSS of the multi-link having a channel overlapping with the channel of the single link is the same as the BSS color of the BSS that includes the station. The station operating on the multi-link may determine that the BSS color of the BSS of the single link having the channel overlapping with the channel of the multi-link is the same as the BSS color of the BSS containing the station. When the station receives a PPDU indicated in the same BSS color as the BSS color of the station's BSS, the station may not perform the SR operation. Accordingly, the transmission collision described above can be prevented. In these embodiments, the BSS color may be assigned through one of the management frames for each link. In this case, the management frame may include at least one of a beacon frame, a probe response frame, and a linkage frame. In addition, the multi-link setup element of the management frame may indicate the BSS color for each link.

The embodiment relating to the BSS color described above may be equally applied to the MAC address or BSSID of the AP.

The MAC address of the AP of the single link operated by one AP multi-link device and the MAC address of all APs of the multi-link may be assigned the same value. The MAC address of the AP of the single link operated by the one AP multi-link device and the MAC address of the AP of at least one link of the multi-link may be assigned the same value. Specifically, when the channel of the single link operated by one AP multi-link device and the channel of the multi-link overlap, the MAC address of the AP of the multi-link having the overlapped channel and the MAC address of the AP of the single link may be assigned the same value.

In another specific embodiment, the station may consider the MAC address of the AP of the multi-link and the MAC address of the AP of the single link to be the same. Specifically, the station operating on a single link may determine that the MAC address of the AP of the multi-link having a channel overlapping with the channel of the single link is the same as the MAC address of the AP to which the station is coupled. The station operating on the multi-link may determine that the MAC address of the AP of the single link having a channel overlapping with the channel of the multi-link is the same as the MAC address of the AP to which the station is coupled. In this case, the MAC address may include at least one of a BSSID, a receiving address (RA), and a transmitting address (TA). In such embodiments, the MAC address of the AP may be allocated through one of the management frames for each link. In this case, the management frame may include at least one of a beacon frame, a probe response frame, and a linkage frame. In addition, the multi-link setup element of the management frame may indicate the MAC address of the AP per link.

In addition, the AID assignment of the station operating on a single link and the AID assignment of the station operating on a multi-link may be performed independently. In such an embodiment, the AID of the station operating on a single link and the AID of the station operating on a multi-link may be assigned the same. In such a case, the station operating on a single link may be mistaken for a station by the receiver of the PPDU transmitted from the multi-link. Accordingly, the station operating on a single link may unnecessarily decode the PPDU transmitted from the multi-link or may not be able to enter the power-save operation. Such a problem may also occur when a station operating in a multi-link receives a PPDU transmitted from a single link.

In another specific embodiment, the AID assignment of the station operating on a single link and the AID assignment of the station operating on a multi-link may be dependent on each other. Specifically, the AID of the station operating on a single link and the AID of the station operating on each link of a multi-link may be assigned within one AID space. Through this, the AID of the station operating on a single link and the AID of the station operating on a multi-link may be assigned not to overlap. The AID assignment may be performed in a multi-link setup. In addition, when the channel of the single link and the channels of the multi-link may overlap, these embodiments may be applied. Specifically, when the channel of the single link and the channels of the multi-link may overlap, the AID of the station operating on the single link and the AID of the station operating on the multi-link may be assigned within one AID space to each other. When the channels of the links may overlap in the operation of the multi-link, the bands of the links of the multi-link may be the same. The band may be one of 2.4 GHz, 5 GHz, and 6 GHz. For example, it may be the case where the band of the first link is 2.4 GHz, and the band of the second link is also 2.4 GHz.

In the embodiments described above, the AID of the identifiers of the station is described as an example. The embodiments described above may also be applied to the embodiments that assign an identifier of a station other than AID.

Figure 20:
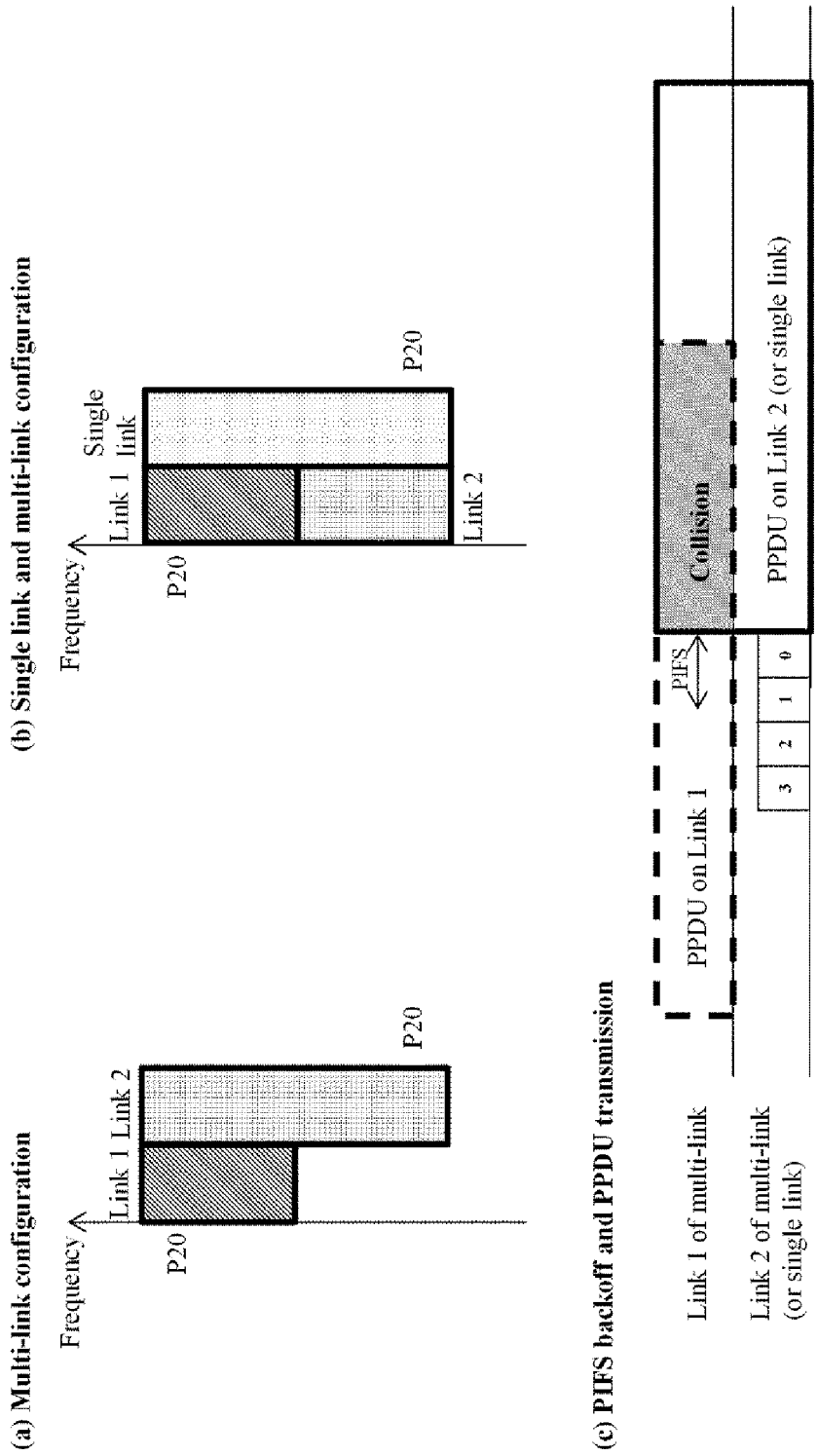
FIG. 20 illustrates a channel access operation in a multi-link operation according to an embodiment of the disclosure.

FIG. 20 illustrates a channel access operation in the multi-link operation according to an embodiment of the disclosure.

As described above, the channel of the single link and the channels of the multi-link may overlap, and the channels of the multi-link may overlap with each other. The PPDU transmitted from another link may be transmitted on a channel other than the main 20 MHz channel of one link.

In addition, the station may perform channel sensing on channels other than the main 20 MHz channel. This channel sensing may be referred to as a point coordination function inter-frame space (PIFS) back-off. In the PIFS backoff, the station may determine whether the channels are idle or busy for PIFS. In this case, the CCA threshold value of the PIFS backoff may be different from the CCA threshold value used for sensing on the main 20 MHz channel or the channel including the main 20 MHz channel. Specifically, the CCA threshold value of the PIFS backoff may be higher than the CCA threshold value used for sensing on the main 20 MHz channel or the channel including the main 20 MHz channel. The CCA threshold value of the PIFS backoff may be one of −72 dBm, −69 dBm, and −66 dBm, and the CCA threshold value used for sensing on the main 20 MHz channel or the channel including the main 20 MHz channel may be one of −82 dBm, −79 dBm, −76 dBm, and −73 dBm in each case. In the PIFS backoff according to the embodiment, the station may be likely to determine that the channel is idle. As a result, collisions may occur between transmissions within multi-links or between transmissions of multi-links and transmissions of single links.

In FIG. 20(a), the channel of the first link Link1 of the multi-link and the channel of the second link Link2 overlap. However, the main 20 MHz channel (P20 channel) of the first link Link1 does not overlap with the main 20 MHz channel (P20 channel) of the second link Link2. In this case, when the transmission is performed at the first link Link1, the station operating on the second link Link2 may perform the PIFS back off. The station operating on the single link may be likely to determine that the channel of the first link Link1 is idle. Accordingly, a collision may occur between transmissions in the multi-link.

As illustrated in FIG. 20(b), the channel of the first link Link1 and the channel of the second link Link2 of the multi-link overlap with the channel of the single link. In this case, when the transmission is performed at the first link 1, the 5 station operating on the single link may perform a PIFS backoff. As described above with reference to FIG. 20(a), the station operating on the single link may be likely to determine that the channel of the first link Link1 is idle. Therefore, a collision may occur between the transmissions of the single link.

Such a transmission collision may also occur even if the SR operation using a BSS identifier, for example, a BSS color may be prevented. However, when the channel of each of the multi-link does not overlap, and the channel of the multi-link and the channel of the single link do not overlap with each other, such a transmission collision may be prevented. In addition, the transmission collision may be prevented by restricting the channel setups of the multi-link and the single link. This will be described with reference to FIG. 21.

Figure 21:
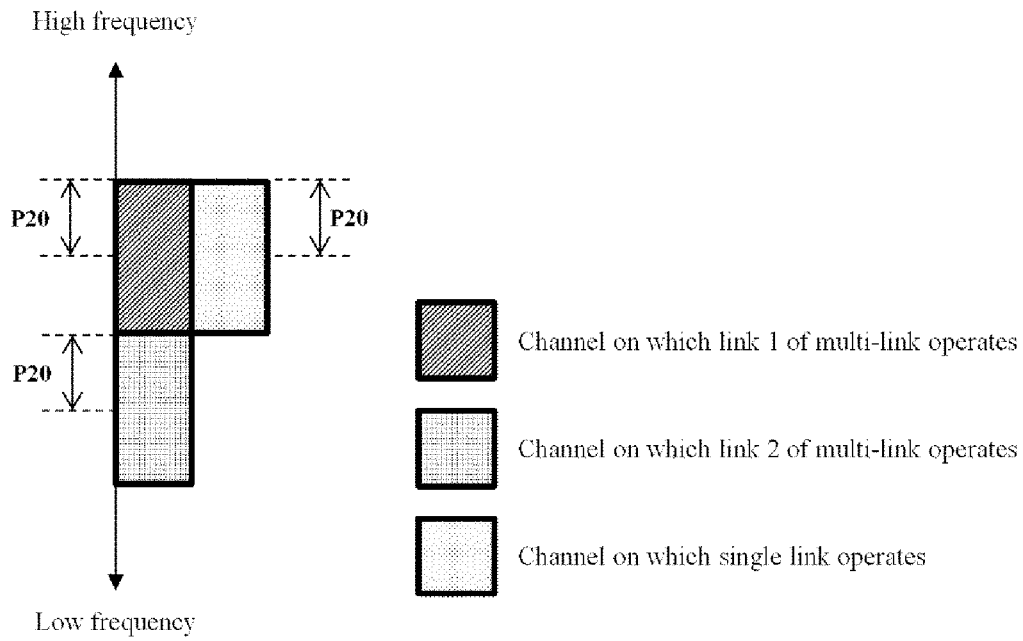
FIG. 21 illustrates a multi-link and channel link configuration according to an embodiment of the disclosure.

FIG. 21 illustrates a multi-link and channel link configuration according to an embodiment of the disclosure.

It may not be allowed that a channel of a single link and a channel of a multi-link overlap with each other. In another specific embodiment, it may be allowed that the channel of the single link and one channel of the multi-link overlap with each other, and it may not be allowed that the channel of the single link and two or more channels of the multi-link overlap with each other. FIG. 21 may show that a multi-link channel and a single-link channel are set up according to the embodiment. In FIG. 21, the channel of the first link Link1 and the channel of the single link overlap. However, the channel of the second link Link2 and the channel of the single link do not overlap. In order for the channel of the single link or the channel of the multi-link not to overlap, a limit on the bandwidth of the channel or the location of the channel of the single link may be applied. In addition, in order not to overlap the respective channels of the multi-links, restrictions on the bandwidth of the channels of the multi-links or the location of the channels may be applied. The location of the channel may be one of a channel number, a priority channel number, and a center frequency.

In addition, the AP may set the main 20 MHz channel of the single link and the main 20 MHz channel of one of the multi-link to be the same. When the channel of the single link overlaps with the channel of one of the links, the AP may set the main 20 MHz channel of the single link and the main 20 MHz channel of one of the multi-link to be the same. For example, the main 20 MHz channel P20 of the first link in FIG. 21 is the same as the main 20 MHz channel P20 of the single link. In such an embodiment, the transmission of the single link may be performed over the channel including the main 20 MHz channel, and the station operating on the single link and the station operating on the multi-link may use the same CCA threshold value when determining whether the main 20 MHz channel is idle. Accordingly, the possibility of the transmission collisions described with reference to FIG. 20 may be reduced.

The operation element may include information about the channel of the link. The operation element may include information about at least one of a bandwidth, a channel number, and a center frequency of the single link. In the preceding embodiment, the operation element indicating information about the channel of the single link may indicate the channel that does not overlap with the channel of the multi-link. Specifically, the channel indicated by the operation element may indicate a channel that overlaps with the channel of one of the multi-link and does not overlap with the remaining channels of the multi-link. The main 20 MHz channel of the channel indicated by the operation element may be the same as the main 20 MHz channel of the multi-link.

The multi-link may be established using a single link. Specifically, the channel of each of the multi-link may be the same as the channel setup of the single link set by the AP. According to the embodiment, the channel of each of the multi-link may be the same as the channel of at least one single link. In another specific embodiment, the channel of each of the multi-link may be set to a channel including the channel of the single link. In another specific embodiment, the channel of at least one of the multi-link may be the same as the channel setup of the single link set by the AP. In such embodiments, the station may use the parameters associated with the operation of the single link as a portion of the parameters associated with the operation of the multi-link. The station may inherit the information signaled by the parameters associated with the operation of the single link to apply the information to some of the parameters associated with the operation of the multi-link. For example, the station may apply information about the channel of the single link obtained from the operating element to some of the parameters associated with the operation of the multi-link. In this embodiment, the AP multi-link device may omit information about the channel of the single link signaled in the operation element from the multi-link setup element. In this case, the parameters associated with the operation of the multi-link may include at least one of the information associated with a BSS color and the operating channel. This may prevent the transmission collision described above with reference to FIG. 20.

In addition, the BSSID of at least one of the multi-link and the BSSID of the single link may be the same. The MAC address of the AP station of the multi-link and the MAC address of the AP station of the single link may be the same. In this embodiment, because the MAC address of the AP station of the multi-link and the MAC address of the AP station of the single link are the same, both the station operating on the multi-link and the station operating on the single link may receive a MAC frame set to the corresponding MAC address. Accordingly, the AP may transmit information to the station operating in the multi-link and the station operating in the single link in one frame. In addition, the AP may trigger the transmission of the station operating on the multi-link and the transmission of the station operating on the single link in one trigger frame.

Figure 22:
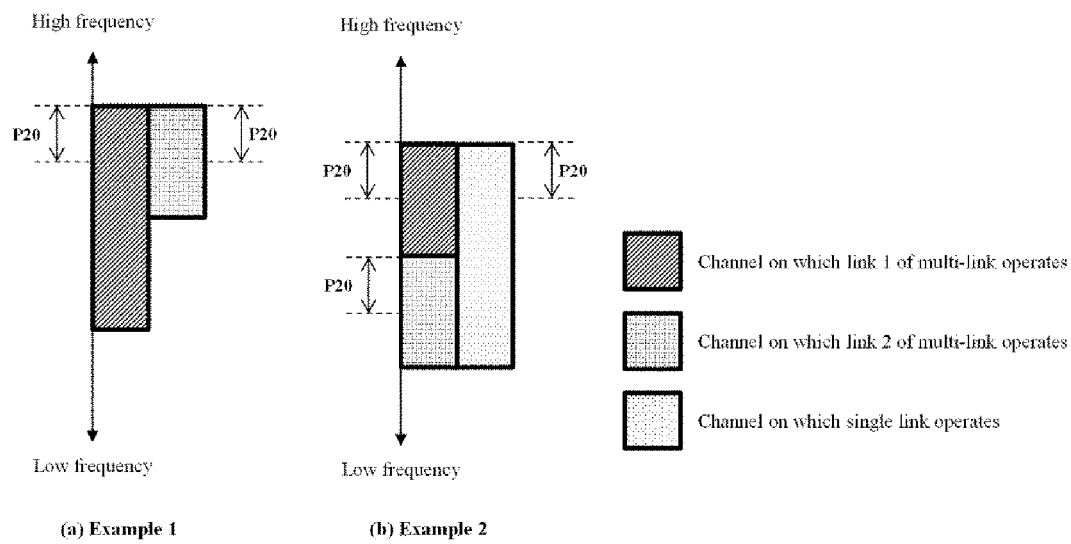
FIG. 22 illustrates multi-link and channel link configuration according to another embodiment of the disclosure.

FIG. 22 illustrates multi-link and channel link setup according to another embodiment of the disclosure.

In addition, when the channel of the single link and the channel of one of the multi-link overlap, the AP may set the main channel of the single link and the main 20 MHz channel of one of the multi-link to be the same. When the channel of the single link and the channel of one of the multi-link overlap, the AP may set the main channel of the single link to be the same as the main channel of one of the multi-link having a channel that overlaps with the channel of the single link. In this case, the main channel may be the main 20 MHz channel. In this embodiment, transmission on the link with the overlapping channel may be performed on the main channel. In addition, both the station operating on the multi-link and the station operating on the single link may determine the same channel as the main 20 MHz channel. Accordingly, the possibility of occurrence of the transmission collision described with reference to FIG. 20 may be reduced.

In FIG. 22(a), the main 20 MHz channel of the first link Link1 and the main 20 MHz channel of the second link Link2 are the same. In FIG. 22(a), when the PPDU transmitted from the first link Link1 is transmitted on the main 20 MHz channel P20 of the second link Link2, the station operating on the second link Link2 may sense the main 20 MHz channel P20 using the CCA threshold value used for channel sensing of the main 20 MHz channel P20. Because the CCA threshold used for channel sensing of the main 20 MHz channel P20 is relatively lower than the value used for channel sensing of channels other than the main 20 MHz channel P20, the station operating in the second link Link2 may be highly likely to determine that the channel is busy. In addition, the station operating on the second link Link2 may set up a NAV, based on the PPDU transmitted from the first link Link1. Accordingly, the station operating on the second link Link2 may not interfere with the transmission at the first link Link1.

In FIG. 22(b), the main 20 MHz channel of the first link Link1 and the main 20 MHz channel of the single link are the same. When the PPDU transmitted from the first link Link1 is transmitted on the main 20 MHz channel P20 of the single link, the station operating on the single link may sense the main 20 MHz channel P20 of the single link using the CCA threshold value used for channel sensing of the main 20 MHz channel P20. Because the CCA threshold value used for channel sensing of the main 20 MHz channel P20 is relatively lower than the value used for channel sensing of the channel other than the main 20 MHz channel P20, the station operating on the single link may be likely to determine that the channel is busy. In addition, the station operating on the single link may set up a NAV, based on the PPDU transmitted from the first link Link1. Accordingly, the station operating on the single link may not interfere with transmission at the first link Link1.

The station may flexibly apply the CCA threshold value according to the situation to solve the problem described in FIG. 20. This will be described with reference to FIG. 23.

Figure 23:
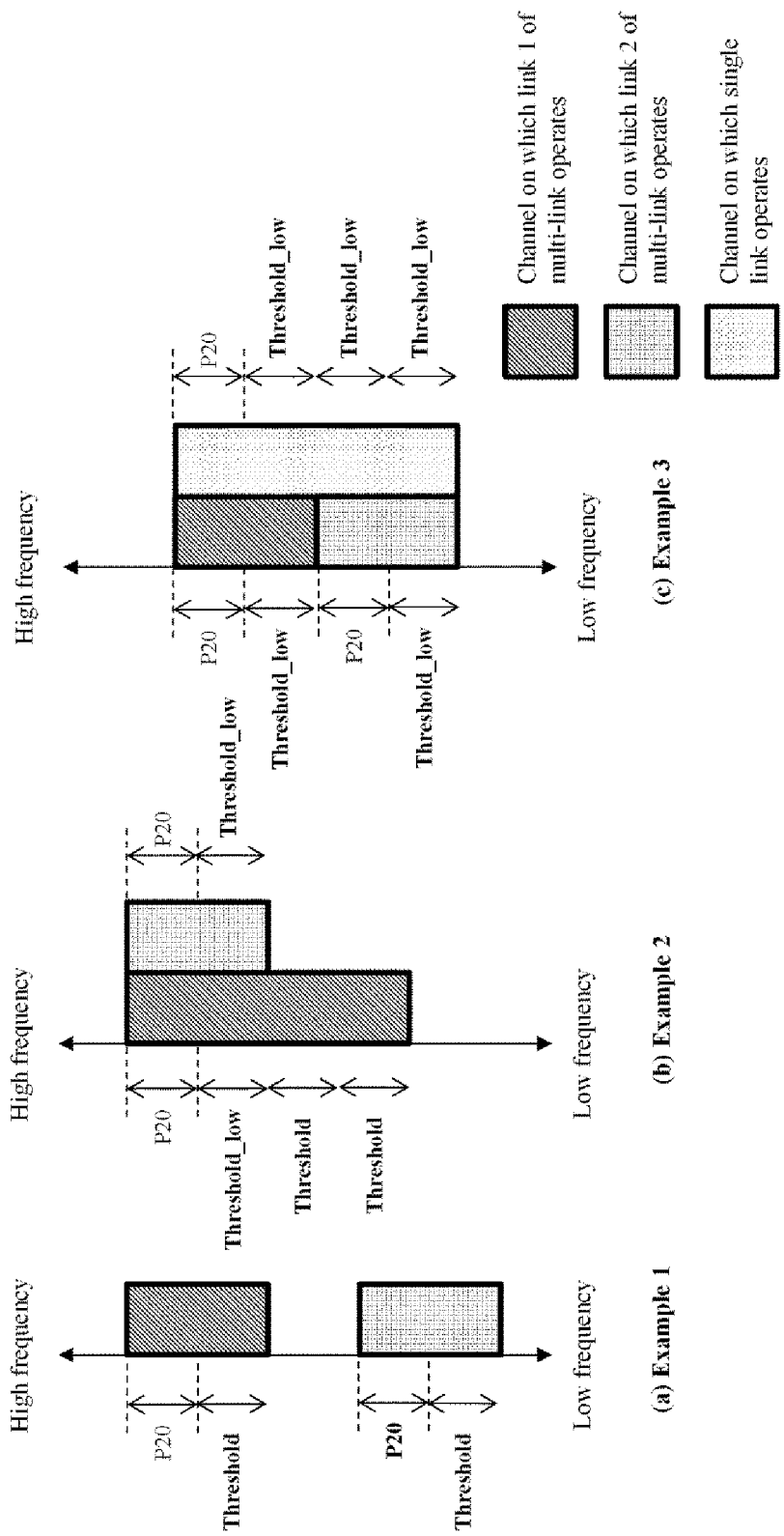
FIG. 23 illustrates an application of CCA threshold values according to embodiments of the disclosure.

FIG. 23 illustrates the application of a CCA threshold value according to an embodiment of the disclosure.

The station may determine the CCA threshold value to be used for sensing the channel of the multi-link, based on whether the channels of each of the multi-link overlap with each other. In addition, the station may determine the CCA threshold value to be used for sensing the channel of the multi-link or the channel of the single link, based on whether the channel of the multi-link and the channel of the single link overlap with each other. Specifically, the station may use a lower CCA threshold when performing channel sensing in a link having a channel overlapping with the channel of another link of a multi-link than when performing channel sensing in a link having a channel that does not overlap with a channel of another link. The CCA threshold value used when sensing a channel on a link with a channel that overlaps with the channel of another link may be a CCA threshold value used when sensing channels other than the main 20 MHz channel. The CCA threshold value used when sensing a channel on a link with a channel that does not overlap with the channel of the other link may be the CCA threshold value used when sensing a channel other than the main 20 MHz channel. In another specific embodiment, the station may use a lower CCA threshold when sensing a channel that overlaps with a channel of another link of the multi-link, than when sensing a channel that does not overlap with a channel of another link.

In FIG. 23(a), the channels of the multi-link do not overlap with each other. In this case, the station may perform channel sensing using the CCA threshold value used to sense the channel other than the main 20 MHz channel.

In FIG. 23(b), the channels of the multi-link overlap with each other. In this case, when the station senses a channel that overlaps with the channel of the other link, the station may use a lower CCA threshold low than when sensing a channel that does not overlap with the channel of the other link.

In FIG. 23(c), the channel of the single link overlaps with the channel of the multi-link. When the station senses a channel that overlaps with a channel in the multi-link, the station may use a lower CCA threshold low than when sensing a channel that does not overlap with a channel in another link.

Figure 24:
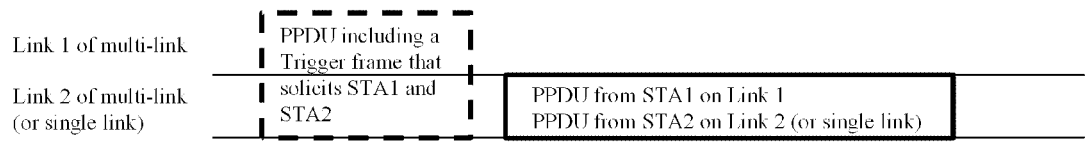
FIG. 24 illustrates a method of transmitting a trigger frame in a multi-link operation according to an embodiment of the disclosure.

FIG. 24 illustrates a method of transmitting a trigger frame in a multi-link operation according to an embodiment of the disclosure.

As described above, one channel of the multi-link may overlap with another channel. In this case, a trigger frame transmitted from one link may be received by a station operating on another link. As described above, when the identifier of the station in the multi-link is assigned independently for each link, the stations operating on different links may be assigned the same identifier. When the stations operating on different links are assigned the same identifier, it may not be possible to distinguish which station the trigger frame triggers from. Accordingly, the station that receives the trigger frame may confuse the station that the trigger frame triggers, and the stations operating on different links may attempt transmission in the same RU.

In FIG. 24, the trigger frame transmitted at the first link Link1 may receive not only a station on the first link Link1 but also a station operating on the second link Link2. In this case, when the identifier of the station operating on the first link Link1 and the identifier of the station operating on the second link Link2 is the same and a trigger frame including the corresponding identifier is transmitted, the station operating on the first link Link1 and the station operating on the second link Link2 may attempt transmission in the same RU.

Accordingly, the trigger frame may include an identifier of the link. In this case, the station that receives the trigger frame may transmit a response for the trigger frame, based on the identifier of the link. Specifically, when the identifier of the link of the trigger frame indicates the link on which the station operates, the station may transmit a response for the trigger frame. The identifier of the link may be the identifier of the link. In addition, the identifier of the link may be a MAC address. Specifically, the identifier of the link may be the MAC address of the AP operating the link.

The MAC addresses of the AP stations affiliated with the AP multi-link device may be different from each other. When the trigger frame includes the MAC address of the AP station, the station receiving the trigger frame may determine whether the station receiving the trigger frame is transmitted on a link in which it operates, based on the MAC address of the AP station included in the trigger frame. In this case, the TA field of the trigger frame may include the MAC address of the AP station. A case in which this embodiment is applied may be limited to cases in which channels of multi-links overlap or channels of multi-links and channels of single-link overlap.

In addition, the address of the AP multi-link device and the address of the AP station including the AP multi-link device may exist separately. When the MAC frame includes the address of the AP multi-link device or the trigger frame includes the address of the AP station that the AP multi-link device includes, the station coupled to the AP station may receive a MAC frame. When the trigger frame includes the address of the AP multi-link device, the problem described with reference to FIG. 24 may occur.

Accordingly, the trigger frame may include the address of the AP station. Specifically, the TA field of the trigger frame may indicate the address of the AP station transmitting the trigger frame. In this case, the address of the AP multi-trigger frame device and the address of the AP station need to be different values. A case in which this embodiment is applied may be limited to cases in which channels of multi-links overlap or channels of multi-links and channels of single-link overlap.

Figure 25:
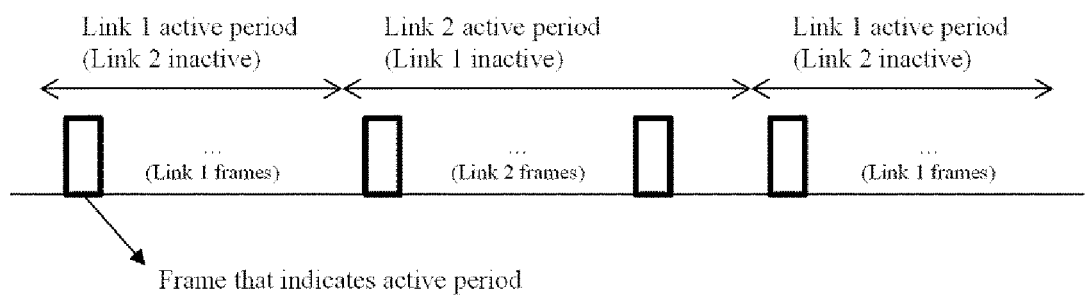
FIG. 25 illustrates a case in which an activation period is specified for each link in a multi-link operation according to an embodiment of the disclosure.

FIG. 25 illustrates a case in which an activation period is specified for each link in a multi-link operation according to an embodiment of the disclosure.

In an embodiment of the disclosure, a time period in which each of the multi-links is activated may be specified. Specifically, frame exchange in a corresponding link may be allowed only in a time period during which the link is activated. In addition, in a time period in which the link is not activated, the frame exchange in the corresponding link may not be allowed. When the channels of the multi-links overlap as described above, or when the channels of the multi-links and the channel of the single link overlap, the activated time period of the link having the overlapping channel may be specified differently. Through this, the problem described with reference to FIGS. 10 to 17 may be solved.

In addition, the AP may transmit information about the activation period of the link. Specifically, the AP may transmit information about the activation period of the link by using a management frame. In this case, the management frame may include at least one of a beacon frame, a linkage response frame, and a probe response frame. The information about the link activation time may include information about at least one of an activation period and an activation time period. The AP multi-link device may not activate a plurality of links in which channels overlap with each other in the same or overlapping time period. Specifically, the AP multi-link device may activate a plurality of links in which the channels overlap with each other in a time period that does not overlap with each other.

In FIG. 25, the multi-link device operates on the first link Link1 and the second link Link2. In this case, the activation time of each of the first link Link1 and the second link Link2 may be specified. As described above, an AP station affiliated with the multi-link device may transmit a frame indicating the activation time of each of the first link Link1 and the second link Link2. When the first link Link1 is activated, the second link Link2 may be deactivated. In addition, when the first link Link1 is deactivated, the second link Link2 may be activated. The channel of the first link Link1 and the channel of the second link Link2 may overlap.

The embodiment described with reference to FIG. 25 may be applied not only when the channels of the multi-links overlap with each other as described above, but also when the channels of the multi-link and the channel of the single link overlap. In this case, the AP multi-link device may set the activation time period of the single link so that the activation time period of the single link does not overlap with the activation time period of the remaining links except for one link of the multi-links. That is, the activation time period of the channel of the single link may overlap with the activation time of up to one link.

As in the embodiments described with reference to FIG. 15, the channel of each of the multi-links may not overlap with each other. This will be described further with reference to FIG. 26.

Figure 26:
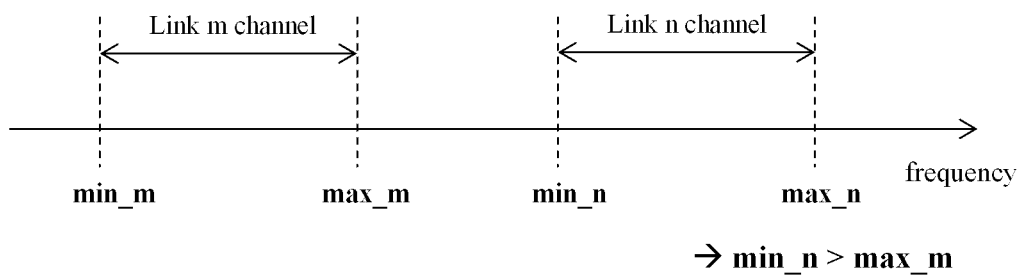
FIG. 26 illustrates the channel configuration conditions of a multi-link according to an embodiment of the disclosure.

FIG. 26 illustrates the channel setting conditions of the multi-link according to an embodiment of the disclosure.

The links in which the multi-link device operates may be represented as link m (link m) and link n (link n). In this case, the channel of link x may be represented as a link x channel. In addition, the minimum frequency value or lower bound of the link x channel may be expressed as min_x. In addition, the min_x may represent a value obtained based on the minimum frequency value or lower bound. In addition, the maximum frequency value or upper bound of the link x channel may be represented as max_x. In addition, the max_x may represent a value obtained based on a maximum frequency value or an upper bound. In this case, each of the min_x and the max_x may indicate one of a frequency's value, a channel number, and a frequency index. In another specific embodiment, the min_x and the max_x may be values obtained based on any one of a frequency value, a channel number, and a frequency index. In another specific embodiment, the min_x and the max_x may be values obtained based on one of a channel width, a central center frequency, a sub-channel offset (channel center frequency segment 0, channel center frequency segment 1), and a main channel.

For example, when the channel width is 20 MHz, the lowest frequency in the band corresponding to the channel number of the main channel may be the min_x, and the highest frequency may be the max_x. In this case, the difference between the max_x and the min_x may be 20 MHz. Alternatively, when the channel width is 20 MHz, the channel number or the value indicating the channel number of the main channel may be the min_x or the max_x. In this case, the difference between the max_x and the min_x may be 0.

In addition, when the channel width is 40 MHz, the lowest frequency of the main channel and the sub channel may be the min_x, and the highest frequency may be max_x. For example, when the channel width is 40 MHz and the sub channel offset is 1, that is, when the sub channel is above the main channel, the min_x may be the lowest frequency of the main channel or may be the corresponding channel number or a channel index. The max_x may be the highest frequency of the sub channel or the corresponding channel number or channel index. In addition, when the channel width is 40 MHz and the sub channel offset is 3, that is, the sub channel is under the main channel, the min_x may be the lowest frequency of the sub channel or the corresponding channel number or channel index. The max_x may be the highest frequency of the main channel or the corresponding channel number or channel index.

In addition, when the channel width is 80 MHz, the lowest frequency among the main channel, the sub 20 MHz channel, and the sub 40 MHz channel may be the min_x, and the highest frequency may be the max_x. For example, the min_x and the max_x may be values obtained based on the channel center frequency segment 0 value. For example, the min_x may be a value obtained by subtracting a value obtained based on a channel width of 80 MHz from channel center frequency segment 0. Alternatively, the min_x may be a value obtained by subtracting a value obtained based on a channel width of 80 MHz from a value obtained based on channel center frequency segment 0. In addition, the max_x may be a value obtained by adding a value obtained based on the channel width of 80 MHz in the channel center frequency segment 0. Alternatively, the max_x may be a value obtained by adding a value obtained based on the channel width of 80 MHz to a value obtained based on the channel center frequency segment 0.

In addition, when the channel width is 160 MHz, the lowest frequency among the main channel, the sub 20 MHz channel, the sub 40 MHz channel, and the sub 80 MHz channel may be the min_x, and the highest frequency may be the max_x. For example, the min_x and max_x may be values obtained based on the channel center frequency segment 0 or the channel center frequency segment 1 value. For example, the min_x may be a value obtained by subtracting a value obtained based on the channel width of 160 MHz from the channel center frequency segment 1. Alternatively, the min_x may be a value obtained by subtracting a value obtained based on a channel width of 160 MHz from a value obtained based on channel center frequency segment 1. In addition, the max_x may be a value obtained by adding a value obtained based on the channel width of 160 MHz in the channel center frequency segment 1. Alternatively, the max_x may be a value obtained by adding a value obtained based on the channel width of 160 MHz to a value obtained based on channel center frequency segment 1.

In addition, when the channel width is 80+80 MHz, the lowest frequency of the main and sub 20 MHz channels, the sub 40 MHz channel, and the sub 80 MHz channel may be the min_x, and the highest frequency may be the max_x. Alternatively, in each 80 MHz segment, the lowest frequency may be min_x, and the highest frequency may be the max_x. For example, the min_x and max_x may be values obtained based on the channel center frequency segment 0 or the channel center frequency segment 1 value. For example, a value obtained by subtracting a value obtained based on 80 MHz from channel center frequency segment 0 or a value obtained by subtracting a value obtained based on 80 MHz from channel center frequency segment 1 may be the min_x. In addition, a value obtained by adding a value obtained based on 80 MHz in channel center frequency segment 0 or a value obtained by adding a value obtained based on 80 MHz in channel center frequency segment 1 may be max_x.

As such, even when the channel widths are 320 MHz and 240 MHz, the min_x and the max_x may be determined based on the channel center frequency value, etc.

The channel center frequency segment 0 may be a value that indicates the center frequency of 80 MHz at which the BSS operates when the channel width is 80 MHz.

The channel center frequency segment 0 may be a value indicating the center frequency of an 80 MHz channel segment including the main channel of the channel on which the BSS operates when the channel width is 160 MHz or 80+80 MHz.

The channel center frequency segment 1 may be a value that indicates the center frequency of the 160 MHz channel on which the BSS operates when the channel width is 160 MHz. The channel center frequency segment 1 may be a value indicating the center frequency of the sub 80 MHz channel on which the BSS operates when the channel width is 80+80 MHz.

According to an embodiment of the disclosure, in order not to overlap the channels of each of the multi-links, the following condition may need to be satisfied. The different links m and n of the multi-link need to satisfy the min_m>=max_n or min_n>=max_m. When each of the min_x and the max_x represents a channel number or a channel index, the different links m and n belonging to the multi-link need to satisfy min_m>max_n or min_n>max_m. When represented differently, the different links m, n need to satisfy (min_m−max_n)*min_n−max_m)<0. Alternatively, the different links m and n need to satisfy (min_m−max_n)*(min_n−max_m)<=0. This may indicate that one link is above in the frequency band without overlapping with the other. For example, when the link n is above the link m in the frequency band, as illustrated in FIG. 36, the min_n will be greater than the max_m to satisfy the above-mentioned conditions. In other words, for different links m and n, min_m<max_n and min_n<max_m are not allowed. Alternatively, for the different links m and n, min_m<=max_n and min_n<=max_m are not allowed. Alternatively, (min_m−max_n)*(min_n−max_m)>0 is not allowed for the different links m and n. Alternatively, (min_m−max_n)*(min_n−max_m)>=0 for the different links m and n is not allowed.

When the above inequality includes an equal sign, each of the min_x, max_x may represent a frequency value. When the inequality does not include an equal sign, min_x and max_x may indicate a channel number or a channel index value.

In addition, when a link includes a discontinuous channel or a punctured channel, the above embodiments may be applied by considering each of the consecutive channels of the discontinuous channel or punctuated channel as a link.

In another specific embodiment, when only the main channels of each of the multi-links are set not to overlap, the above min_x and max_x may be the lowest frequency and the highest frequency of the main channel.

In addition, the embodiments described with reference to FIG. 26 may be applied to the embodiments described with reference to FIG. 21. The content described in FIG. 26 may be applied to a case in which a single link channel and a multi-link channel may not overlap. For example, the link m may be a single link, and the link n may be one of multi-links. In this case, for the links m and n, there may be at most one link n where min_m<max_n and min_n<max_m. Alternatively, for the links m and n, there may be at most one link n where min_m<=max_n and min_n<=max_m. Alternatively, for the links m and n, there may be at most one link n where (min_m−max_n)*(min_n−max_m)>0. Alternatively, for the links m and n, there may be at most one link n with (min_m−max_n)*(min_n−max_m)>=0.

Described differently, min_m>max_n or min_n>max_m needs to be satisfied except for at most one link among multiple links. Alternatively, min_m>=max_n or min_n>=max_m needs to be satisfied except for at most one link among multiple links. Alternatively, (min_m−max_n)*

(min_n−max_m)<0 needs to be satisfied except for at most one link among multiple links. Alternatively, (min_m−max_n)*(min_n−max_m)<=0 needs to be satisfied except for at most one link among multiple links.

Although the disclosure has been described using WLAN communication as an example as described above, the disclosure is not limited thereto and may be equally applied to other communication systems such as cellular communication. In addition, although the methods, devices, and systems of the disclosure have been described in connection with certain embodiments, some or all of the components, operations of the disclosure may be implemented using a computer system having a general-purpose hardware architecture.

The features, structures, effects, etc. described in the above embodiments are included in at least one embodiment of the disclosure and are not necessarily limited to one embodiment. Further, the features, structures, effects, etc. illustrated in each embodiment may be combined or modified for other embodiments by one of ordinary skill in the art to which the embodiments belong. Accordingly, the contents relating to these combinations and modifications should be construed as falling within the scope of the disclosure.

Although described above with a focus on the embodiment, this is only an example and is not limited to the disclosure, and those of ordinary skill in the art to which the present invention pertains will appreciate that various modifications and applications not exemplified above are possible without departing from the essential characteristics of the present embodiment. For example, each component specifically illustrated in the embodiment is one that may be modified and implemented. In addition, the differences relating to these modifications and applications should be construed as falling within the scope of the disclosure as defined in the appended claims.

The invention claimed is:

1. A non-access point (AP) station communicating with an AP multi-link device using a plurality of links, the non-AP station comprising:
   a transceiver; and
   a processor,
   wherein the processor is configured to:
   receive a management frame from the AP multi-link device by using the transceiver; and
   obtain a multi-link setup element including information required for setting the plurality of links from the management frame, and
   wherein the multi-link setup element includes a common part including information corresponding to all links signaled by the multi-link setup element and a link-specific part independently including information corresponding to each of a plurality of links signaled by the multi-link setup element,
   wherein each of the all links is identified by each link identifier (ID) of each of the all links and an association identifier (AID) of another non-AP station affiliated with a non-AP multi-link device to which the non-AP station is affiliated is the same as the AID of the non-AP station, and
   wherein a channel of a link of the another non-AP station does not overlap with a channel of a link of the non-AP station.

2. The non-AP station of claim 1, wherein the link-specific part includes a BSS color field indicating a BSS color for each link.

3. The non-AP station of claim 2, wherein the plurality of links are assigned different BSS colors.

4. The non-AP station of claim 1, wherein a channel setting of one link among the plurality of links is the same as a channel setting of a single link set by the AP multi-link device.

5. The non-AP station of claim 4, wherein the processor inherits information signaled with a parameter related to an operation of the single link and applies the same to some of parameters related to an operation of the multi-link.

6. The non-AP station of claim 1, wherein an activation time period of each of the plurality of links is designated.

7. An access point (AP) multi-link device using a plurality of links, the AP multi-link device comprising:
   a transceiver; and
   a processor,
   wherein the processor is configured to:
   generate a multi-link setup element including information required for setting the plurality of links; and
   insert the multi-link setup element into a management frame, and
   wherein the multi-link setup element includes a common part including information corresponding to all links signaled by the multi-link setup element and a link-specific part independently including information corresponding to each of a plurality of links signaled by the multi-link setup element,
   wherein each of the all links is identified by each link identifier (ID) of each of the all links and the AP multi-link device assigns a single value with an association identifier to a plurality of non-AP stations affiliated with a non-AP multi-link device, and
   wherein each channel of each link of the plurality of non-AP stations does not overlap with each other.

8. The AP multi-link device of claim 7, wherein the link-specific part includes a BSS color field indicating a BSS color for each link.

9. The AP multi-link device of claim 8, wherein the plurality of links are assigned different BSS colors.

10. The AP multi-link device of claim 7, wherein a channel setting of one link among the plurality of links is the same as a channel setting of a single link set by the AP multi-link device.

11. The AP multi-link device of claim 10, wherein information signaled with a parameter related to an operation of the single link is inherited and applied to some of the parameters related to an operation of the multi-link.

12. The AP multi-link device of claim 7, wherein an activation time period of each of the plurality of links is designated.

13. A method of operating a non-access point (AP) station communicating with an AP multi-link device using a plurality of links, the method comprising:
   receiving a management frame from the AP multi-link device; and
   obtaining a multi-link setup element including information required for setting the plurality of links from the management frame,
   wherein the multi-link setup element includes a common part including information corresponding to all links signaled by the multi-link setup element and a link-specific part independently including information corresponding to each of a plurality of links signaled by the multi-link setup element,
   wherein each of the all links is identified by each link identifier (ID) of each of the all links and an association identifier (AID) of another station affiliated with a non-AP multi-link device to which the station is affiliated is the same as the AID of the station, and wherein a channel of a link of the another non-AP station does not overlap with a channel of a link of the non-AP station.

14. The method of claim 13, wherein the link-specific part includes a BSS color field indicating a BSS color for each link.

15. The method of claim 14, wherein the plurality of links are assigned different BSS colors.

* * * * *